(12) United States Patent
Eisley et al.

(10) Patent No.: US 11,087,515 B2
(45) Date of Patent: Aug. 10, 2021

(54) LOSSLESSLY EXCHANGING IMAGE LAYER DATA BETWEEN IMAGE EDITING APPLICATIONS

(71) Applicant: Adobe Inc., San Jose, CA (US)

(72) Inventors: William Eisley, San Francisco, CA (US); Sandeep Pradhan, Noida (IN); Robert Sargent, San Jose, CA (US); Puneet Gupta, Delhi (IN); Paul George, Hillsborough, CA (US); Harjot Singh, New Delhi (IN); Frank Stokes-Guinan, San Jose, CA (US); Ashish Anand, Noida (IN); Abhishek Garg, Delhi (IN)

(73) Assignee: ADOBE INC., San Jose, CA (US)

( * ) Notice: Subject to any disclaimer, the term of this patent is extended or adjusted under 35 U.S.C. 154(b) by 92 days.

(21) Appl. No.: 16/682,936

(22) Filed: Nov. 13, 2019

(65) Prior Publication Data

US 2021/0142541 A1 May 13, 2021

(51) Int. Cl.
*G06T 11/60* (2006.01)
*G06T 1/00* (2006.01)

(52) U.S. Cl.
CPC ............ *G06T 11/60* (2013.01); *G06T 1/0007* (2013.01)

(58) Field of Classification Search
CPC .............................. G06T 11/60; G06T 1/0007
See application file for complete search history.

(56) References Cited

U.S. PATENT DOCUMENTS

2012/0185768 A1* 7/2012 Dowd ................... G06F 3/0481
715/702
2016/0283049 A1* 9/2016 Faydi .................... G06F 3/0482

OTHER PUBLICATIONS

PSD Library SDK—Molecular Matters; date downloaded Nov. 14, 2019; https://molecular-matters.com/products_psd_sdk.html.

* cited by examiner

Primary Examiner — Jitesh Patel
(74) *Attorney, Agent, or Firm* — Keller Jolley Preece

(57) ABSTRACT

Methods, systems, and non-transitory computer readable storage media are disclosed for losslessly exchanging image layer data between image applications by generating an edit-restricted layer for one image application to represent an incompatible or unsupported image layer from another image application. For example, the disclosed system can determine that one or more image layers in a layered image file formatted for a layered image application include characteristics incompatible (e.g., unsupported) with a feature-restricted image application. The disclosed system can then generate an edit-restricted image layer representing the image layer(s) in the feature-restricted image application by limiting or preventing edit operations to the edit-restricted layer as a type of preview object. The disclosed system can also store image layer data from the feature-restricted image application back to the layered image file for viewing and editing in the layered image application without loss of image layer data corresponding to the edit-restricted layer.

20 Claims, 17 Drawing Sheets

LOSSLESSLY EXCHANGING IMAGE LAYER DATA BETWEEN IMAGE EDITING APPLICATIONS

BACKGROUND

Digital image editing systems include tools for users to create and edit digital image content by interacting with individual elements of a digital image. For example, many digital image editing systems allow users to create and edit separate image layers to modify corresponding visual characteristics or positions of components of digital images. To illustrate, digital image editing systems can include image applications with options for users to modify color, lighting, or other characteristics of all (or specific parts) of a digital image via image layers.

SUMMARY

This disclosure describes one or more embodiments of systems, methods, and non-transitory computer readable storage media that solve the foregoing problems and provide other benefits. In particular, the disclosed systems can losslessly exchange image layer data between image applications by generating an edit-restricted layer for one image application to represent an incompatible or unsupported image layer from another image application. For example, in one or more embodiments, the disclosed systems identify a request to open a layered image file formatted for a layered image application and analyze the file in a feature-restricted image application. The disclosed systems further determine that image layers from the layered image file include characteristics incompatible (e.g., unsupported) with the feature-restricted image application. The disclosed systems can then generate an edit-restricted image layer representing the images layers in the feature-restricted image application by limiting or preventing edit operations to the edit-restricted image layer as a type of preview object. Even when the image applications do not have the same set of features and capabilities, the disclosed systems can thus accurately retain image layer data across image applications.

BRIEF DESCRIPTION OF THE DRAWINGS

Various embodiments will be described and explained with additional specificity and detail through the use of the accompanying drawings in which.

DETAILED DESCRIPTION

Figure 1:
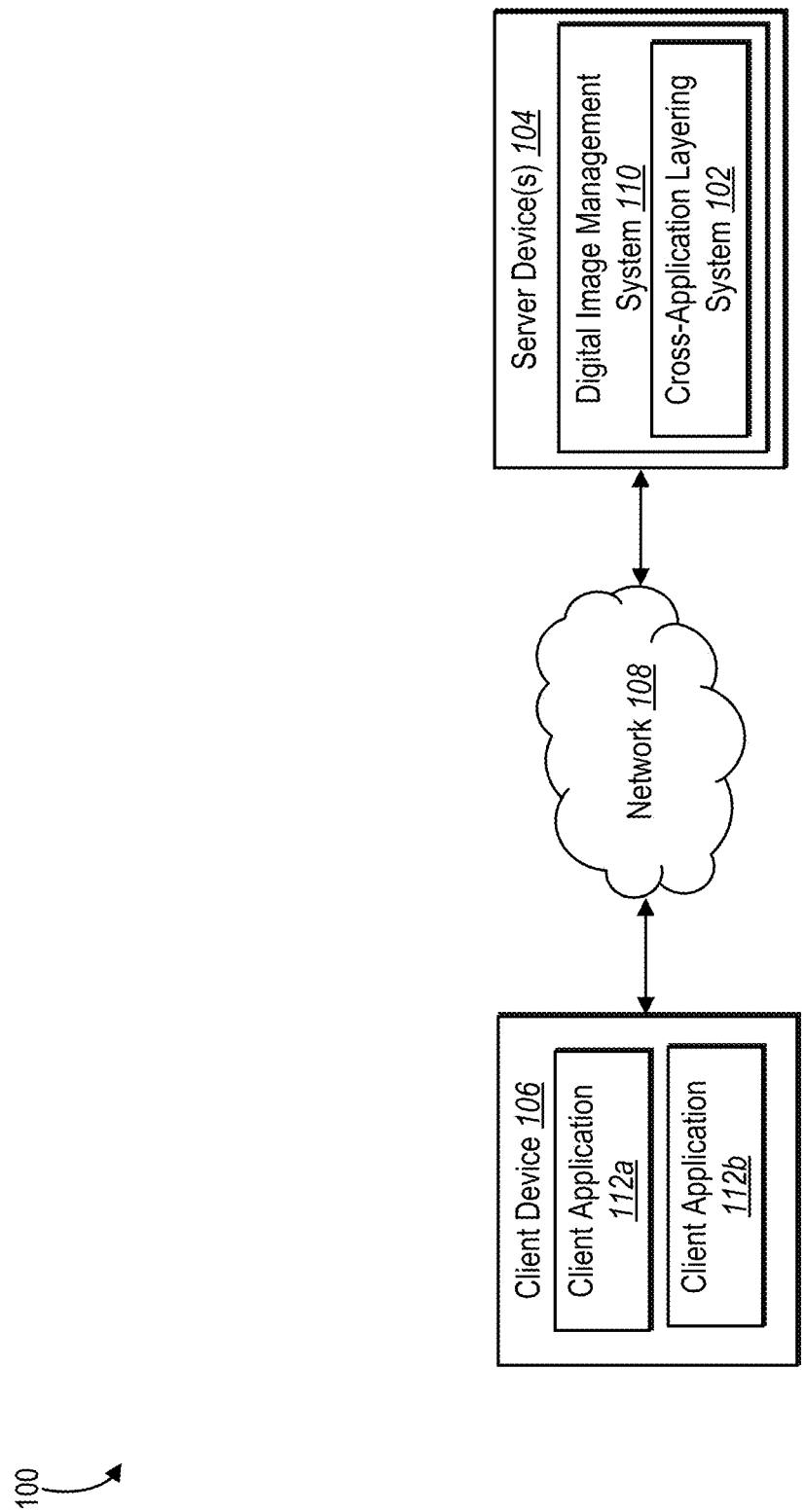
FIG. 1 illustrates an example system environment in which a cross-application layering system can operate in accordance with one or more implementations.

This disclosure describes one or more embodiments of a cross-application layering system that converts image layer data across image applications without losing such data by generating an edit-restricted layer for one image application to represent an incompatible or unsupported image layer from another image application. For example, the cross-application layering system (or simply "layering system") can identify a request to utilize a feature-restricted image application to open a layered image file formatted for a layered image application. The layering system further determines whether one or more of the image layers include characteristics incompatible with the feature-restricted image application. Upon determining that at least one such layer is incompatible, the layering system generates an edit-restricted layer representing incompatible layers by limiting edit operations available for the edit-restricted layer as a type of preview object within the feature-restricted image application. The layering system can thus represent a layer from the layered image application in the edit-restricted layer within the feature-restricted image application.

In addition to generating such an edit-restricted layer for an incompatible image layer, in certain implementations, the layering system identifies an image layer from the layered image file compatible with the feature-restricted image application. The layering system can generate an editable layer corresponding to such a compatible layer. By generating both the edit-restricted layer and the editable layer, the layering system can open the layered image file and provide an image corresponding to the layered image file for display within the feature-restricted image application on a display device.

In one or more embodiments, the layering system can also modify image layers from an image layer stack within the feature-restricted image application based on user inputs. For instance, the layering system can generate or modify editable image layers and certain features of edit-restricted image layers using capabilities of the feature-restricted image application. But the layering system prevents or restricts certain edit operations on the edit-restricted layers within the feature-restricted image application to prevent losing image layer data recognized by the layered image application. For instance, in some cases, the layering system limits editing to a subset of edit operations for an edit-restricted layer representing a single incompatible layer, such as by limiting editing operations to one or more of a layer-blend-mode operation, a layer-name operation, or a layer-opacity operation. Additionally, or alternatively, the layering system prevents certain edit operations altogether without flattening the edit-restricted layer. Furthermore, the layering system can prevent editing of an edit-restricted layer representing more than one related, incompatible layer (e.g., where one or more incompatible layers modify another layer), including preventing operations that modify layer properties such as blend, name, or opacity.

After opening a layered image file, in one or more embodiments, the layering system stores both edited and unedited image layer data from the feature-restricted image application to the same layered image file. For instance, the layering system can compare image layer data in the feature-restricted image application to layer image data from the layered image file as stored by the layered image application. The layering system can organize and format the image layer data from the feature-restricted application for the layered image application and store the formatted image layer data layer back to the layered image file. The layering system can open a layered image file using image applications having different capabilities while retaining image layer data from each application.

In response to a request to save image layer data from the feature-restricted image application, for instance, the layering system can determine whether editing has introduced any new (or deleted) image layers or whether to move any previous image layers to new positions in a layer stack. Furthermore, the layering system can convert any edit-restricted layers back to the corresponding image layer(s) associated with the layered image application. For example, the layering system can determine a position of an edit-restricted layer in the image layer stack associated with the feature-restricted image application. The layering system can then place the corresponding incompatible layer(s) represented by the edit-restricted layer in a corresponding position of the image layer stack associated with the layered image file. If the layering system inserted or deleted any layers using the feature-restricted image application, the layering system can insert or delete corresponding layers within the image layer stack associated with the layered image file. The layering system can thus ensure that the image layer stack associated with the feature-restricted image application and the image layer stack associated with the layered image file have the same image layer data.

As suggested above, some previous or existing digital image editing systems allow users to create and edit digital content via separate image layers. But such previous or existing systems inaccurately represent (or impose limits on) image files of one image application when opened in another image application. For instance, previous or existing digital image editing systems often do not retain or represent certain information in image files when opening the image files in other applications, such as layer-specific information. Further to the point, some image applications can provide operations or functionality that other image applications do not support. When opening image files formatted for a first image application in a second image application, the second image application is often not configured to recognize or represent certain features (in the image files) unsupported by the second image application. Such previous or existing systems lose image data from the image files based on the unrecognized features (e.g., from image layers) when rendering image content from the image files in such a second image application, resulting in inaccurate image reconstruction in the second image application.

In addition to inaccurately representing or limiting the representation of image files, some previous or existing digital editing systems limit the editing functionality of some image applications. Because some image applications do not recognize or support image layers (or features across image layers) from another image application, some existing digital editing systems lack corresponding code to support editing such image layers or features. In some cases, previous or existing digital image editing systems include limited tools for editing image layers or features from an image file in one image application only to distort or misrepresent those same image layers or features when another image application opens the image file.

The disclosed cross-application layering system provides a number of advantages over such previous or existing digital editing systems. For example, the layering system improves the accuracy with which a device or system utilizing cross-application image editing represents or exchanges data for image layers. In particular, the layering system improves accuracy by retaining image layer data across a plurality of image applications that have different feature sets by using edit-restricted layers. By converting image layers that have characteristics incompatible with a feature-restricted image application into an edit-restricted layer, the layering system can prevent the feature-restricted image application from making modifications to a layered image that result in losing image layer data. By limiting editing operations for an edit-restricted layer to simple functions, such a layer-blend-mode operation and a layer-opacity operation, the layering system can likewise facilitate editing some features of an image layer with incompatible characteristics in a feature-restricted image application without corrupting or distorting the image layer when the layered image file is opened in the layered image application.

In addition to improving the accuracy of representing or exchanging data for image layers, the cross-application layering system improves the efficiency with which a device or system utilizing cross-application image editing can use a layered image file across multiple image applications. By using one or both of editable layers and edit-restricted layers in a feature-restricted image application, the layering system facilitates opening, viewing, and editing a layered image across image applications using a single layered image file and format. For example, rather than requiring a user to save a layered image to a separate file format or recreate components lost when opening a layered image file in a different image application other than the image application used to create the file, the layering system can open a single image file in separate image applications having different features and capabilities. The layering system can thus reduce processing and storage loads on a computing device by using edit-restricted layers to protect image layer data and facilitate cross-application use of a layered image file.

As illustrated by the foregoing discussion, the present disclosure utilizes a variety of terms to describe features and advantages of the layering system. For example, as used herein, the term "image application" refers to an application executable on a computing device for viewing a digital image on a display device. Additionally, an image application can include an image editing application that applies modifications to digital images including raster-based or vector-based image content. As used herein, the term "layered image application" refers to an image application for viewing a digital image including image layer data. For instance, a layered image application analyzes image layer data to (upon execution) cause a computing device to display a digital image based on the image layer data. Additionally, a layered image application can be an image editing application that generates, deletes, or modifies image layer data (e.g., image layers) in a digital image.

As used herein, the term "feature-restricted image application" refers to an image application that has a limited set of features or capabilities relative to a layered image application. In particular, a feature-restricted image application can lack features associated with characteristics of one or more image layers in a layered image file. A feature-restricted image application may thus be incapable of performing certain operations associated with an image layer due to the lack of features or capabilities of the feature-restricted image application. In one or more embodiments, a feature-restricted image application can also be a layered image application with different feature availability than a layered image application that creates a layered image file. Additionally, a plurality of image applications involved in editing a digital image may be feature-restricted image applications relative to each other.

As used herein, the terms "image layer" and "layer" refer to a digital element or level of a digital image on which an image editing application can apply imaging effects or image components. Such an image layer may include imaging effects or components over or under other image components. For instance, an image layer can include one or more elements of a digital image such as, but not limited to, objects or scenes within a digital image or a filter or modifier that modifies one or more objects or components in a digital image. Additionally, the term "edit-restricted layer" refers to an image layer that is editable by a limited set of available edit operations. In at least some implementations, an edit-restricted layer may not be editable by any edit operations. Alternatively, an edit-restricted layer may be editable by a particular subset of edit operations that do not modify the characteristic(s) of the corresponding image layers incompatible with a feature-restricted image application. As used herein, the term "editable layer" refers to an image layer that is editable by a set of available edit operations in a feature-restricted image application. In some cases, an editable layer is editable by the same set of edit operations in a feature-restricted image application as in a layered image application.

As used herein, the term "flattened image layer" refers to an image layer generated by combining a plurality of image layers. Specifically, a flattened image layer includes a single image layer that an image application (or other device software) causes a computing device to generate by combining a plurality of separate image layers and removing separate layer properties from the plurality of separate image layers. In some cases, flattening a plurality of image layers removes certain image layer properties that allow for editing individual components or characteristics corresponding to the separate layers (e.g., by removing transparent areas and combining separate objects and object properties into a single image component).

As used herein, the term "layered image file" refers to a digital image file that includes data describing one or more different image layers of a digital image. For instance, a layered image file can include an image layer stack with one or more image layers corresponding to different elements or levels of a digital image. Additionally, a layered image file can include a digital file having a specific file extension corresponding to an image application, such as .PSD or .PSDC. Furthermore, as used herein, the terms "image layer stack" and "layer stack" refer to an ordered list of image layers associated with a layered image file. For example, a layer stack can indicate which image layers of a digital image are over or under other image layers of the digital image. A layer stack can also indicate whether one or more image layers are associated with one or more image layers of a digital image.

Additional detail will now be provided regarding the cross-application layering system in relation to illustrative figures portraying exemplary implementations. To illustrate, FIG. 1 includes an embodiment of a system environment 100 in which a cross-application layering system 102 ("layering system 102") operates. In particular, the system environment 100 includes server device(s) 104 and a client device 106 in communication via a network 108. Moreover, as shown, the server device(s) 104 include a digital image management system 110 including the layering system 102. Additionally, the client device 106 can include a plurality of client applications, such as a first client application 112a and a second client application 112b.

In some embodiments, the first client application 112a constitutes a layered image application, and the second client application 112b constitutes a feature-restricted image application. For example, the first client application 112a can cause the client device 106 to create, display, and modify a layered image file by creating, displaying, and modifying digital image content including one or more image layers. The second client application 112b can also cause the client device 106 to display and modify the same layered image file. In one or more embodiments, the second client application 112b includes a different feature set (e.g., different set of available operations, functionality, or supported image layer data) than the first client application 112a. Accordingly, the layering system 102 can prepare the layered image file for use within the second client application 112b via the use of edit-restricted layers representing incompatible image layer data. In one or more alternative embodiments, the first client application 112a and/or the second client application 112b can include web browser applications that access one or more web-based image editing applications from the server device(s) 104.

As shown in FIG. 1, the server device(s) 104 include the digital image management system 110. The digital image management system 110 can include a variety of systems that manage digital image content for one or more user accounts. The digital image management system 110 can also store, display, and allow interactions with digital image content across a variety of applications (e.g., in a suite of related applications). The digital image management system 110 can also include or be part of a system that provides the digital image content to client devices (e.g., as part of marketing communications). The digital image management system 110 can also provide digital image management tools and usage and performance information associated with the digital image content in connection with marketing communications or other uses of the digital image content.

As further shown in FIG. 1, the digital image management system 110 includes the layering system 102. In particular, the layering system 102 can perform operations associated with managing digital images that include image layer data. For example, the layering system 102 can open layered image files and perform operations on (e.g., view, edit) the layered image files based on user input using a plurality of image applications (e.g., the first client application 112a and the second client application 112b). For example, the layering system 102 can perform operations for converting image layer data between formats of different image applications within the layered image file. The layering system 102 can manage data associated with editing and converting image layer data between formats including, but not limited to, digital images, image layers, or edit operations to image layers (e.g., modifications stored in temporary memory).

In one or more embodiments, the layering system 102 can communicate with a plurality of client devices associated with a user account. For instance, the client device 106 can utilize the digital image management system 110 to store digital image content accessible to any client devices associated with the user account. A user can thus perform operations associated with layered image files stored at the digital image management system 110 via a plurality of client devices by communicating with the layering system 102.

Furthermore, in at least some embodiments, the layering system 102 can host image applications for access via a web browser or other remote access application at the client device 106. To illustrate, the layering system 102 can provide the first client application 112a and the second client application 112b via a web browser interface that a user of the client device 106 can access via the network 108. Accordingly, the layering system 102 can host image applications for performing editing operations at the server device(s) 104 in addition to, or instead of, the client device 106 performing editing operations at the first client application 112a and the second client application 112b.

In one or more embodiments, the server device(s) 104 include a variety of computing devices, including those described below with reference to FIG. 7. For example, the server device(s) 104 can include one or more servers for storing and processing data associated with digital image content and digital image editing. The server device(s) 104 can also include a plurality of computing devices in communication with each other, such as in a distributed storage environment. Furthermore, the server device(s) 104 can include devices and/or components in connection with systems hosting digital image content, such as one or more third-party image hosting systems. In some embodiments, the server device(s) 104 comprise a content server. The server device(s) 104 can also comprise an application server, a communication server, a web-hosting server, a social networking server, a digital content campaign server, or a digital communication management server.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 7. Furthermore, although not shown in FIG. 1, the client device 106 can be operated by a user (e.g., a user included in, or associated with, the environment) to perform a variety of functions. In particular, the client device 106 can perform functions such as, but not limited to, creating, storing, uploading, downloading, viewing, and/or modifying a variety of digital content (e.g., digital videos, digital audio, and/or digital images). The client device 106 can also perform functions for requesting and displaying information associated with digital content from the digital image management system 110. For example, the client device 106 can communicate with the server device(s) 104 via the network 108 to interact with digital images including image layers. Although FIG. 1 illustrates the system environment 100 with a single client device 106, the system environment 100 can include a different number of client devices.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104 and the client device 106 communicating via the network 108, the various components of the systems 100 can communicate and/or interact via other methods (e.g., the server device(s) 104 and the client device 106 can communicate directly). Furthermore, although FIG. 1 illustrates the layering system 102 being implemented by a particular component and/or device within the system environment 100, the layering system 102 can be implemented, in whole or in part, by other computing devices and/or components in the system environment 100. For example, in some embodiments, the client device 106 implements the layering system 102. While this disclosure describes the layering system 102 performing certain actions without express reference to the server device(s) 104 or the client device 106, in some embodiments, the layering system 102 includes computer-executable instructions that cause server device(s), a client device, or other computing device to perform actions described below.

Figure 2A:
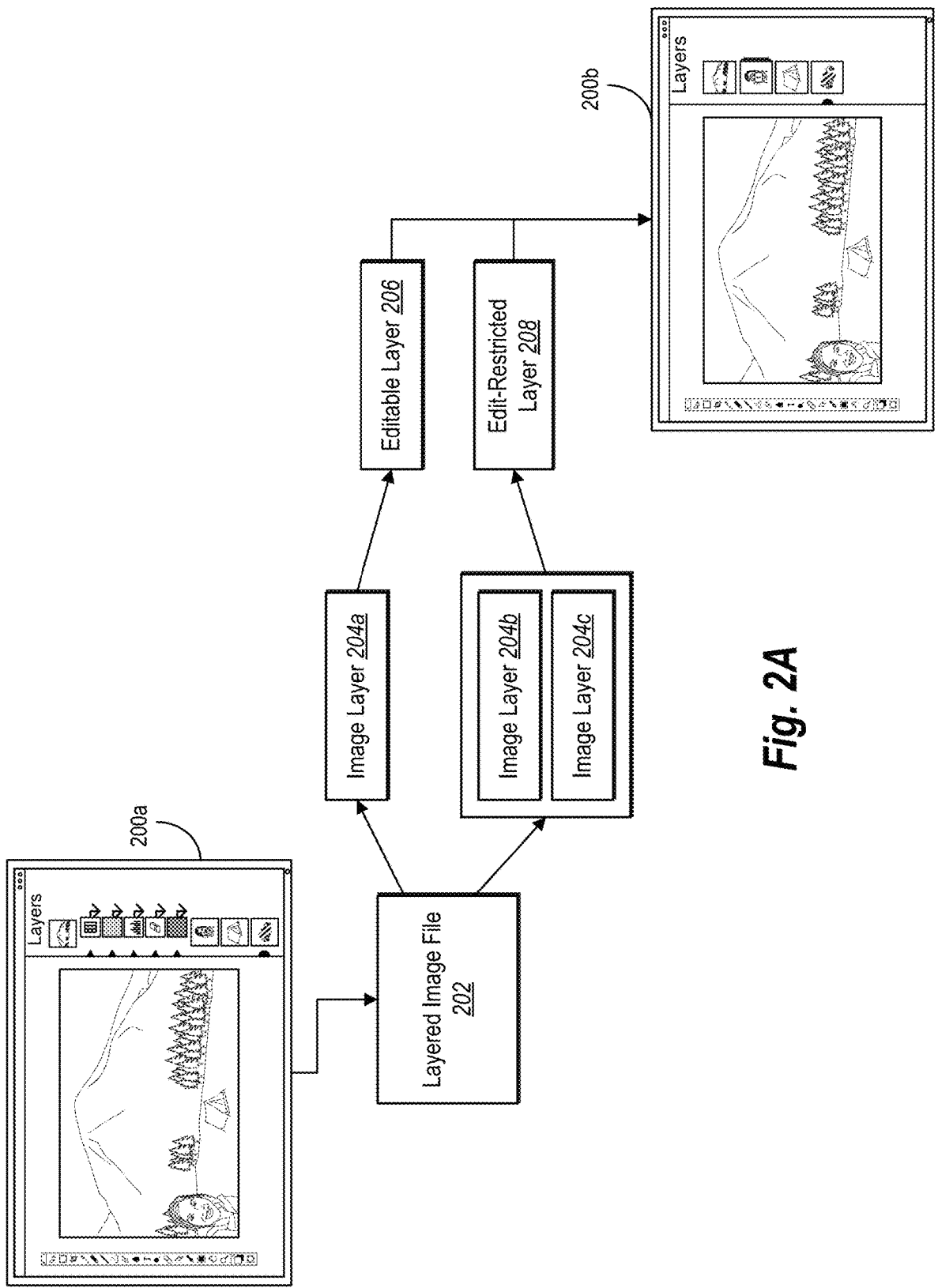
FIG. 2A-2B illustrate an overview of the cross-application layering system converting image layers between image applications in accordance with one or more implementations.
Figure 2B:
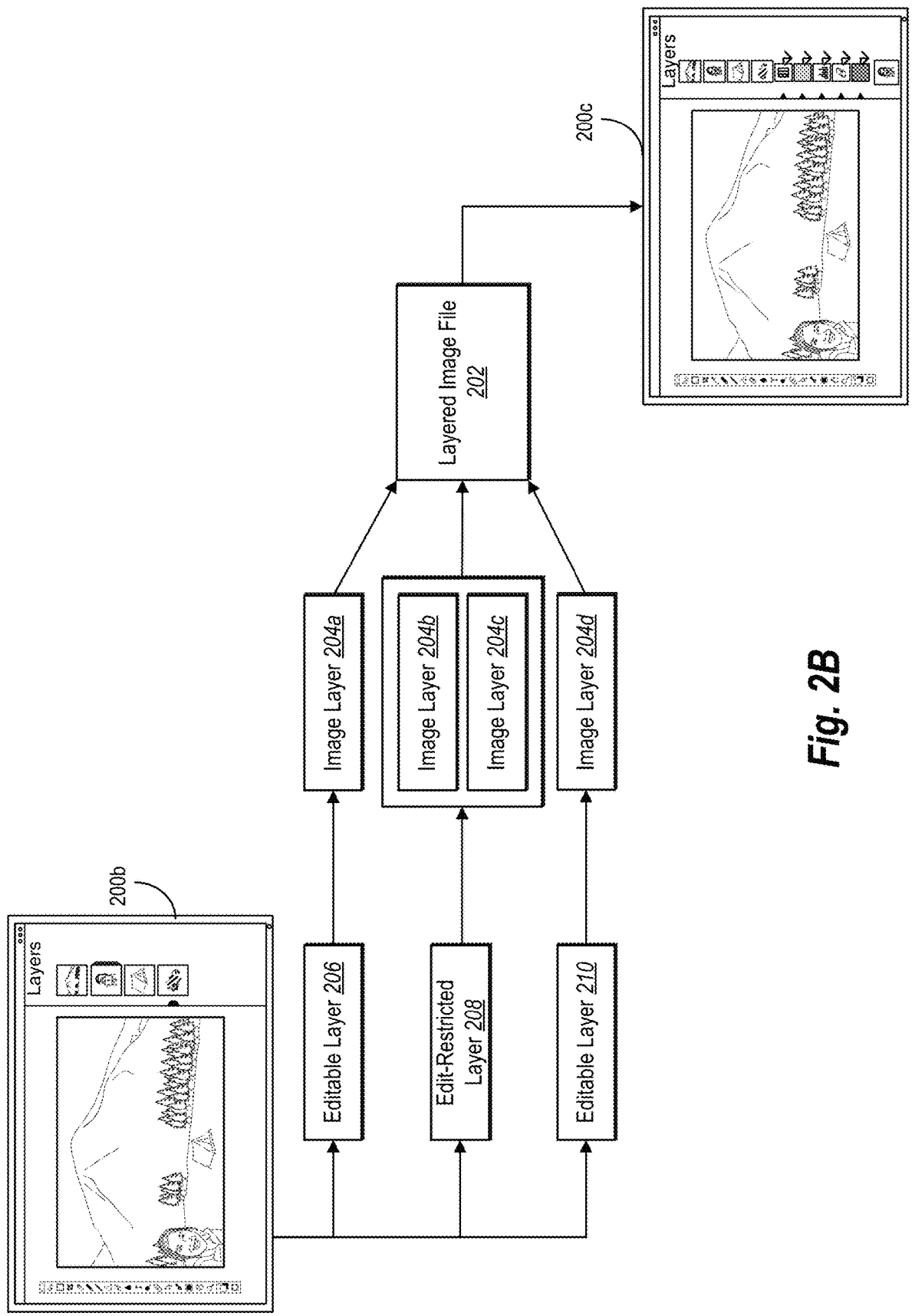

As mentioned above, the layering system 102 can convert image layers between formats for a plurality of different image applications. FIGS. 2A-2B illustrate overviews of for the layering system 102 converting image layers in a layered image file in accordance with one or more embodiments. Specifically, FIG. 2A illustrates the layering system 102 converting image layers in a layered image file from a format associated with a layered image application to a format associated with a feature-restricted image application within the layered image file. FIG. 2B illustrates the layering system 102 converting the image layers from the format associated with the feature-restricted image application back to the format associated with the layered image application within the layered image file when storing image layers to the layered image file. As suggested above, in some embodiments, the layering system 102 utilizes the first client application 112a as a layered image application and the second client application 112b as a feature-restricted image application.

In one or more embodiments, as illustrated in FIG. 2A, layered image content 200a from a layered image file 202 includes a plurality of image layers 204a-204c. Specifically, the layering system 102 opens the layered image file 202 in a layered image application and performs operations on the layered image content 200a (e.g., a digital image) based on user input. Accordingly, the layering system 102 can provide tools for interacting with digital content in a variety of ways. For example, the layering system 102 can provide tools for interacting with the plurality of image layers 204a-204c. To illustrate, the layering system 102 generates the plurality of image layers 204a-204c using specific features of the layered image application based on user input.

Additionally, by creating the image layers 204a-204c using the layered image application, the layering system 102 formats the image layers 204a-204c for the layered image application. For instance, the layered image file 202 can include metadata including information about each of the image layers 204a-204c. By formatting the layered image file 202 for the layered image application, in some embodiments, the layering system 102 formats the metadata of the layered image file 202 for the layered image application to read and write to the image layers 204a-204c according to available features of the layered image application. The layering system 102 can thus generate, modify, or delete image layers of the layered image file 202 using the layered image application.

As further illustrated in FIG. 2A, the layering system 102 converts the plurality of image layers 204a-204c from a formatting for the layered image application to a formatting for a feature-restricted image application. Because the image layers 204a-204c are formatted for the layered image application, in certain implementations, one or more of the image layers 204a-204c may not be compatible with the feature-restricted image application. To illustrate, a first image layer 204a is compatible with the feature-restricted image application, such that the feature-restricted image application causes a computing device to correctly display and perform operations on the first image layer 204a based on user input. Additionally, a second image layer 204b and a third image layer 204c is incompatible with the feature-restricted image application, such that the feature-restricted image application may not cause a computing device to correctly display and/or perform operations on the second image layer 204b and the third image layer 204c based on user input.

In one or more embodiments, the layering system 102 converts compatible image layers (e.g., the first image layer 204a) by storing information from the compatible image layer in an image layer that corresponds to the feature-restricted image application. For instance, the feature-restricted image application may include application-specific information in its image layers for managing the image layers (e.g., naming and determining an order of the image layers). Accordingly, the layering system 102 can move or copy information from an image layer formatted for the layered image application to an image layer formatted for the feature-restricted image layer. FIG. 2A illustrates that the resulting image layer from converting the first image layer 204a is an editable layer 206. The feature-restricted image application can modify the editable layer 206 in the same (or similar) manner as the layered image application.

In one or more additional embodiments, the layering system 102 converts incompatible image layers (e.g., the second image layer 204b, the third image layer 204c) by generating one or more new layers that contain the information from the incompatible layers, but that have limited interactivity within the feature-restricted image application. For example, the feature-restricted image application may lack one or more features of the layered image application. Accordingly, the layering system 102 can generate one or more edit-restricted layers (e.g., edit-restricted layer 208) representing incompatible image layers from the layered image file 202. Generating the edit-restricted layer 208 allows the feature-restricted image application to accurately display the image content corresponding to the second image layer 204b and the third image layer 204c while limiting edit operations available to perform on the edit-restricted layer 208.

Once the layering system 102 has converted the image layers 204a-204c from the layered image file 202 to a format that is compatible with the feature-restricted image application, the layering system 102 can then display layered image content 200b based on the converted image layer data using the feature-restricted image application. In particular, the layering system 102 generates the layered image content 200b from the editable layer 206 and the edit-restricted layer 208 (e.g., from data stored in memory based on the contents of the layered image file 202). The layering system 102 can then present the layered image content 200b within the feature-restricted image application while performing operations on the editable layer 206 (e.g., editing operations) based on user input and limiting available operations for the edit-restricted layer 208.

In addition to converting image layer data from a format for a layered image application to a format for a feature-restricted image application, the layering system 102 can also convert the image layer data back to a format for the layered image application. For example, FIG. 2B illustrates the layering system 202 converting image layer data back to a format for the layered image application when storing image layer data from the feature-restricted image application to the layered image file 202. By converting and storing the image layer data from the feature-restricted image application back to a format for the layered image application in the layered image file 202, in certain implementations, the layering system 102 uses a single image file across a plurality of applications without losing image layer data.

In one or more embodiments, the layering system 102 analyzes the layered image content 200b in response to a request to store the layered image content 200b to the layered image file 202. The layering system 102 determines whether the layered image content 200b includes any modifications to image layer data, including added image layers, removed image layers, or modified image layers. For instance, as shown in FIG. 2B, the layering system 102 determines that the layered image content 200b includes the editable layer 206, the edit-restricted layer 208, and an additional editable layer 210. Accordingly, the layering system 102 determines that the layered image file 202 includes a new layer (i.e., the additional editable layer 210) using the feature-restricted image application.

As further shown in FIG. 2B, the layering system 102 converts the image layer data from a format associated with the feature-restricted image application to a format associated with the layered image application. Specifically, the layering system 102 converts editable layers (e.g., editable layer 206, additional editable layer 210) to corresponding image layers (e.g., first image layer 204a, new image layer 204d) formatted for the layered image application. Additionally, the layering system converts edit-restricted layers (e.g., edit-restricted layer 208) to corresponding image layers (e.g., second image layer 204b, third image layer 204c) formatted for the layered image application and stores the image layers (e.g., image layers 204a-204d) in the layered image file 202.

In one or more embodiments, the resulting image layers (e.g., image layers 204a-204d) are compatible with the layered image application. The layered image application can cause a computing device to display layered image content 200c based on the updated image layer data from the layered image file 202. For instance, the layering system 102 organizes the image layer data in the layered image file 202 in a way that is consistent with the organization within the feature-restricted image application. Thus, the layering system 102 can ensure that layered image content from the layered image file 202 is displayed correctly across a plurality of image applications.

In one or more additional embodiments, the layering system 102 performs similar operations for generating edit-restricted layers for the layered image application if the image layers include any image layer data incompatible with the layered image application. For instance, if the feature-restricted image application includes features or capabilities that the layered image application does not have, the layering system 102 generates image layer data that indicates the information and preserves the information. To illustrate, the layering system 102 can store such information in additional edit-restricted layers or in metadata that allows the layered image application to accurately display any corresponding image layer data.

Figure 3A:
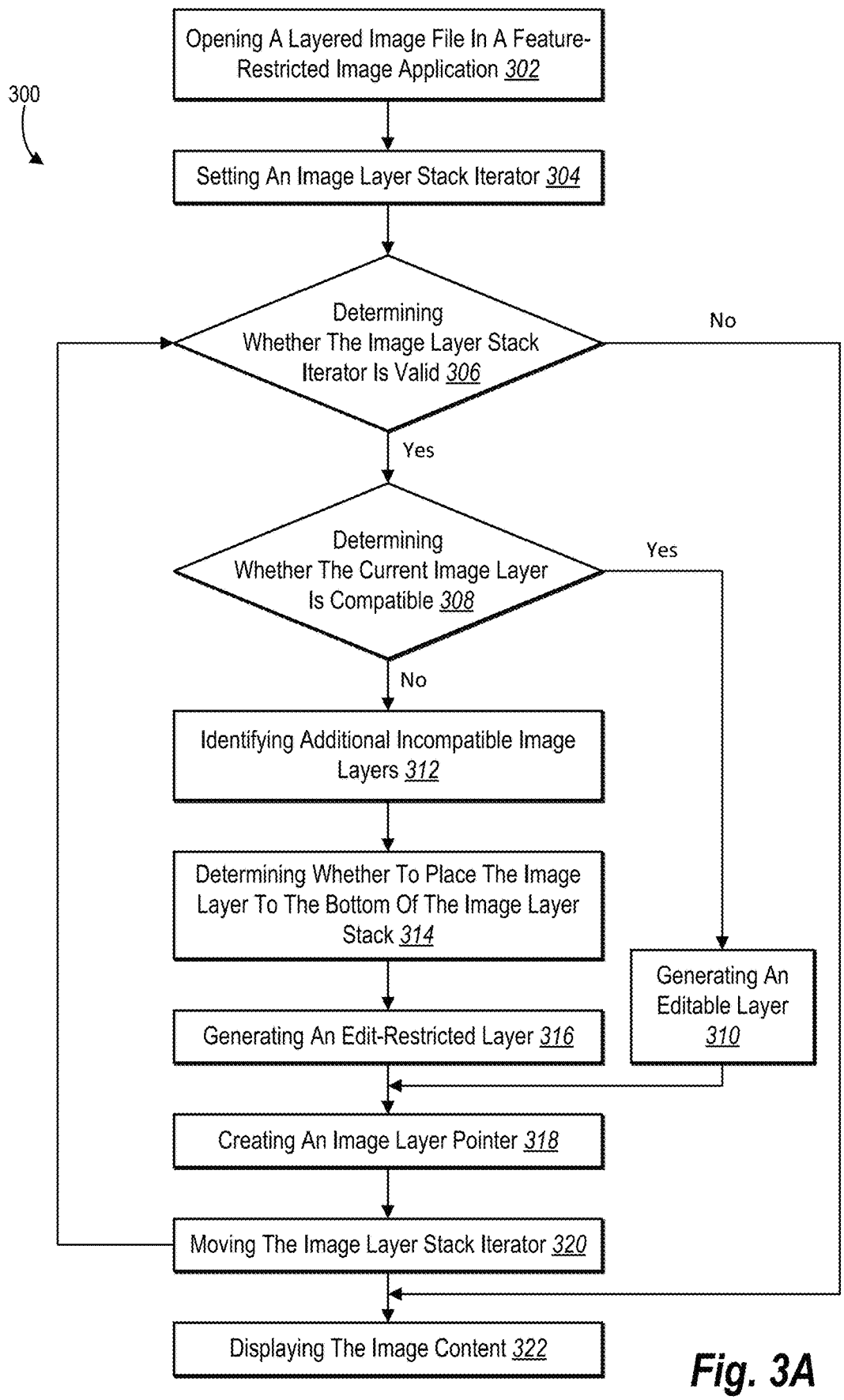
FIGS. 3A-3B illustrate the cross-application layering system generating and storing an editable image layers for image layers compatible between image applications and edit-restricted layers for image layers incompatible between image applications in accordance with one or more implementations.
Figure 3B:
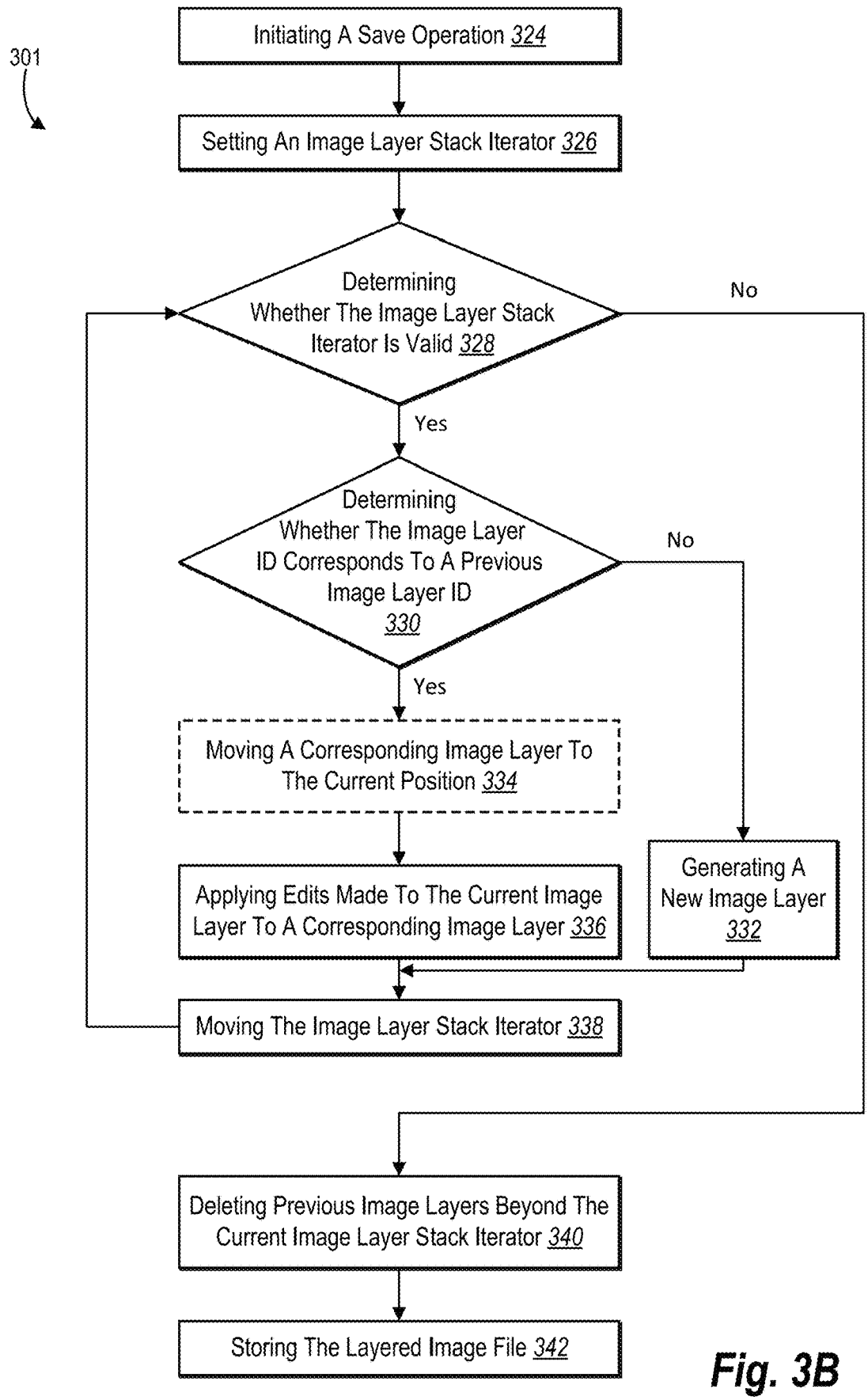

FIGS. 3A-3B illustrate the layering system 102 converting image layers between image applications using a single layered image file. In particular, FIG. 3A illustrates for the layering system 102 converting image layers in a layered image file from a format associated with a layered image application to a format associated with a feature-restricted image application. FIG. 3B illustrates for the layering system 102 storing image layers back to the layered image file from the feature-restricted image application in the format associated with the layered image application. FIGS. 3A-3B accordingly illustrate to the layering system 102 opening a layered image file within different image applications while accurately displaying image content of the layered image file in the different image applications.

As illustrated in FIG. 3A, in one or more embodiments, the layering system 102 can perform a series of acts 300 for making image layer data in a layered image file compatible with a feature-restricted image application. For example, as illustrated in FIG. 3A, the layering system 102 can perform an act 302 of opening a layered image file in a feature-restricted image application. To illustrate, the layered image file may be formatted for a layered image application in response to generating and/or saving the layered image file using the layered image application. The layering system 102 can then receive an indication of a request from a computing device to open the layered image file in a feature-restricted image application that is different than the layered image application. As previously described, the feature-restricted image application can include a feature set (e.g., set of functions for interacting with digital image content) that is different than the feature set of the layered image application.

As further shown in FIG. 3A, in response to the request to open a layered image file using a feature-restricted image application, the layering system 102 performs an act 304 of setting an image layer stack iterator (e.g., a pointer) for the layered image file. As indicated above, the layered image file can include an image layer stack corresponding to one or more image layers of the layered image file. The image layer stack can indicate a display order of the one or more image layers of the layered image file including where each image layer displays (e.g., in front or behind) relative to each other image layer in the image layer stack. To illustrate, in some embodiments, the layering system 102 sets the iterator to a first (e.g., top) image layer of the image layer stack so that the layering system 102 can manage an order in which the layering system 102 analyzes the image layer(s).

As further shown in FIG. 3A, the layering system 102 also performs an act 306 of determining whether the image layer stack iterator is valid. By determining that the iterator is valid, the layering system 102 determines whether the layering system 102 has any more image layers to analyze. For instance, after first initiating the image layer stack iterator on the image layer stack for the layered image file, the iterator points to the first (e.g., top) image layer in the image layer stack (assuming the image layer stack includes at least one image layer). Because the iterator points to an existing image layer in the image layer stack, the layering system 102 determines that the iterator is valid. As discussed below, if the iterator does not point to an existing image layer, the iterator is not valid, and (in some cases) the layering system 102 completes a process of opening the layered image file.

In response to determining that the image layer stack iterator is valid, the layering system 102 performs an act 308 of determining whether a current image layer (e.g., an image layer to which the iterator points) is compatible with the feature-restricted image application. For example, the layering system 102 can determine whether the current image layer includes image layer data that the feature-restricted image application is unable to process. To illustrate, the layering system 102 may determine that the feature-restricted image application is unable to properly display/render the current image layer, which can affect the display accuracy of the image content within the feature-restricted image application. In some embodiments, such image layer data can include adjustment layers that modify color or tonal properties of one or more other image layers in the image layer stack.

When performing the act 308, in some cases, the layering system 102 determines whether the current image layer includes data associated with features unavailable in the feature-restricted image application. For instance, the layering system 102 can determine that the feature-restricted image application does not have a feature for performing a particular edit operation associated with an image layer in the layered image file. The feature sets for each of the layered image application and the feature-restricted image application may depend on the purposes of each image application. To illustrate, if the layered image application is a raster-based image editor that generates and modifies digital image content using a variety of tools, a digital photo editor that modifies digital photographs may lack many of the editing tools of the raster-based image editor. Similarly, the raster-based image editor may lack some of the editing tools of the digital photo editor.

In one or more embodiments, in response to determining that the current image layer is compatible with the feature-restricted image application, the layering system 102 performs an act 310 of generating an editable layer for the current image layer. Specifically, the layering system 102 can convert a compatible image layer in a format associated with the layered image application to an editable layer in a format associated with the feature-restricted image application. For instance, the layering system 102 can move or copy image layer data stored in an image layer associated with the layered image application to an image layer associated with the feature-restricted image application (e.g., in a format that the feature-restricted image application recognizes as an image layer). By moving or copying the image layer data, the layering system 102 can retain all of the information contained within the current image layer. The layering system 102 can also allow any edit operations to the editable layer within the feature-restricted image application that are also applicable in the layered image application due to the compatibility of the feature-restricted image with the current image layer.

In addition to generating an editable layer, in certain implementations, the layering system 102 generates or otherwise determines a layer identifier for the editable layer based on the current image layer in the image layer stack. To illustrate, the layering system 102 can determine an identifier of the current image layer assigned by the layered image application. The layering system 102 can also assign the determined identifier to the new image layer corresponding to the feature-restricted image application. This may allow the layering system 102 to more easily identify a mapping between the image layers of the respective image applications, though the layering system 102 may use any suitable naming convention for the generated image layers in an image layer mapping.

If the current image layer is incompatible with the feature-restricted image application (e.g., based on properties and contents of the current image layer), the layering system 102 can instead convert the current image layer to a format compatible with the feature-restricted image application. As illustrated by FIG. 3A, the layering system 102 performs an act 312 of identifying additional incompatible image layers. For instance, the layering system 102 can determine whether one or more other image layers are grouped with the current image layer, such as based on content of the other image layer(s), proximity to the current image layer in the image layer stack, or whether an image layer indicates relationship to another image layer (e.g., in a manual or automatic image layer grouping). The layering system 102 can thus identify one or more image layers incompatible with the feature-restricted image application and associated with one another.

As further illustrated in FIG. 3A, in one or more embodiments, the layering system 102 also performs an act 314 of determining whether to place the image layer to the bottom of the layer stack associated with the feature-restricted image application. If the current image layer has certain properties that affect other image layers in the image, for instance, the layering system 102 may determine that the resulting edit-restricted layer should be placed at (e.g., pinned to) the bottom of the image layer stack. To illustrate, the layering system 102 may make such a determination based on the top-most image layer of the corresponding edit-restricted layer that the layering system 102 will generate for the incompatible image layers. For example, as previously mentioned, adjustment layers that modify color or tone of other image layers below the adjustment layers may result in such a determination.

As further shown in FIG. 3A, after identifying one or more related image layers incompatible with the feature-restricted image application, the layering system 102 performs an act 316 of generating an edit-restricted layer. For instance, the layering system 102 can generate the edit-restricted layer representing the one or more incompatible layers by creating a single image layer with a specific set of attributes that limits the type of edit operations that a user may perform on the edit-restricted layer within the feature-restricted image application. According to one or more embodiments, the layering system 102 generates an attributes set for the edit-restricted layer to prevent the feature-restricted image application from performing any edit operations if the edit-restricted layer represents more than one image layer.

In one or more alternative embodiments, if the edit-restricted layer represents only a single image layer, the layering system 102 identifies a subset of edit operations available within the feature-restricted image application. Specifically, the layering system 102 may allow the feature-restricted image application to perform certain operations that do not change the image contents of the image layers represented by the edit-restricted layer. For example, the layering system 102 can perform operations such as, but not limited to, a layer name operation, a layer opacity operation, a layer lock operation, and a layer blend mode operation. Such operations may modify metadata identifying the edit-restricted layer or modify how the edit-restricted layer affects other image content in the layered image file.

As FIG. 3A illustrates, in connection with generating the edit-restricted layer and the corresponding attributes set, the layering system 102 also performs an act 318 of creating an image layer pointer for the generated image layer. In particular, the layering system 102 can generate a mapping between the generated image layer for the feature-restricted image application and the corresponding image layer(s) of the layered image application. Mapping the generated image layer to the corresponding image layers from the image layer stack allows the layering system 102 to convert the generated image layers back into a format for use in the layered image application when storing image layer data from the feature-restricted image application to the layered image file.

In one or more embodiments, the layering system 102 generates a pointer for an edit-restricted layer based on at least one identifier of the corresponding incompatible image layer(s). For instance, the layering system 102 can determine a layer identifier for a top/first layer of the incompatible image layer(s). The layering system 102 can then assign the determined layer identifier to the edit-restricted layer to indicate that the edit-restricted layer corresponds to the top layer of the incompatible image layer(s). In one or more embodiments, the layering system 102 also includes other indicators, such as a number appended to the end of the determined layer identifier to indicate how many total image layers correspond to the edit-restricted layer. In alternative embodiments, the layering system 102 may generate the pointer based on a combination of layer identifiers for a plurality of image layers corresponding to the edit-restricted layer.

After generating an image layer and mapping the image layer to the corresponding image layer(s) from the image layer stack, the layering system 102 can proceed with analyzing a subsequent image layer in the image layer stack. Specifically, as shown in FIG. 3A, the layering system 102 performs an act 320 of moving the image layer stack iterator to the next image layer in the image layer stack that has not been analyzed. For example, after generating an editable layer for an image layer, the layering system 102 can move the image layer stack iterator to the next image layer in the image layer stack (e.g., down one image layer). Additionally, after generating an edit-restricted layer for one or more incompatible image layers, the layering system 102 can move the image layer stack iterator to the next image layer in the image layer stack after the last image layer mapped to the edit-restricted layer. Thus, the layering system 102 can move the image layer stack iterator any number of positions down in the image layer stack based on the current image layer and any additional image layers analyzed in connection with the current image layer.

After moving the image layer stack iterator to the next image layer in the image layer stack to be analyzed, in some cases, the layering system 102 again determines whether the image layer stack iterator is valid. If there are more image layers in the image layer stack to analyze, the layering system 102 can repeat the acts previously described (e.g., acts 308-320) for each image layer (or group of image layers) in the image layer stack until the image layer stack iterator is no longer valid. Thus, the layering system 102 may generate a new image layer stack including a plurality of edit-restricted layers and/or a plurality of editable layers based on the image layers and order of image layers in the original image layer stack.

When the layering system 102 has finished analyzing all of the image layers in the image layer stack of the layered image file, the layering system 102 performs the act 322 of displaying the image content of the layered image file in the feature-restricted image application. In particular, the layering system 102 can use the new layer stack with the generated editable and edit-restricted layers to accurately display image content from the layered image file within the feature-restricted image application. Additionally, the layering system 102 can display image layers or image layer data from the new image layer stack with the image content (e.g., next to the image content within a user interface).

Once the layering system 102 displays the image content within the feature-restricted image application, the layering system 102 may also modify or rearrange the image content and/or the image layers based on user input. For instance, the feature-restricted image application may edit the image content by generating image layers, modifying image layers, or removing image layers based on the available set of edit operations for each image layer. Accordingly, the layering system 102 may modify editable layers using one or more edit operations available within the feature-restricted image application, and which are also available within the layered image application. Furthermore, for edit-restricted layers, the layering system 102 may limit edit operations or prevent the use of edit operations based on the established attributes of the edit-restricted layers.

As described in relation to FIG. 3A, the layering system 102 can perform operations for converting image layer data from a formatting for one image application to a formatting for another image application within a single layered image file. The operations allow the layering system 102 to open a layered image file using a plurality of different image applications while retaining image layer data and accurately displaying image content within each of the image applications. Accordingly, the acts and operations illustrated and described above in relation to FIG. 3A provide the corresponding acts for a step for converting at least one image layer of a layered image file to an edit-restricted layer.

As mentioned, FIG. 3B illustrates the layering system 102 storing image layer data from a feature-restricted image application back to a layered image file. Specifically, FIG. 3B illustrates a series of acts 301 for converting image layers formatted for a feature-restricted image application to image layers formatted for a layered image application in a layered image file. For example, FIG. 3B illustrates the layering system 102 performing an act 324 for initiating a save operation to save image content to a layered image file. In one or more embodiments, the layering system 102 receives a request from a computing device to save the image content to a layered image file. In some embodiments, such a layered image file was originally created using a layered image application and then opened within the feature-restricted image application. The layering system 102 may receive the save operation after a user has made one or more modifications to image layer data associated with the image content via the feature-restricted image application. If the layering system 102 determines that no modifications to the image content have occurred after opening the layered image file within the feature-restricted image application, the layering system 102 can revert the layered image file to a version of the layered image file stored in memory.

As shown in FIG. 3B, in response to the request to save the image content to the layered image file, the layering system 102 performs an act 326 of setting an image layer stack iterator for the image layer data associated with the feature-restricted image application. To illustrate, the layering system 102 can set the iterator to a last (e.g., bottom) image layer of the image layer stack. In addition, the layering system 102 can set an iterator for the image layer stack associated with the layered image application (e.g., an image stack stored in memory for a version of the layered image file at the time of opening the layered image file in the feature-restricted image application). Thus, the layering system 102 can set image layer stack iterators for iterating through a plurality of image layer stacks associated with the feature-restricted image application and the layered image application in parallel to verify the image layer data and ensure accuracy when converting the image layer data back to a format associated with the layered image application.

In one or more embodiments, as illustrated in FIG. 3B, after initializing iterators for the image layer stacks, the layering system 102 performs an act 328 of determining whether the image layer stack iterator is valid. More specifically, the layering system 102 determines whether the image layer stack iterator corresponding to the feature-restricted image application is valid. Iterating through the entirety of the image layer stack associated with the feature-restricted image application allows the layering system 102 to write all of the relevant image layer data to the layered image file. As described in more detail below, once the layering system 102 has iterated through the image layer stack associated with the feature-restricted image application, in some cases, the layering system 102 completes the save operation.

As further illustrated by FIG. 3B, in response to determining that the image layer stack iterator is valid (e.g., points to an existing image layer), the layering system 102 performs an act 330 of determining whether the current image layer identifier ("ID") for the current image layer corresponds to a previous image layer ID. In particular, the layering system 102 can determine whether an image layer ID for the current image layer in the image layer stack associated with the feature-restricted image application is mapped to an image layer ID for an image layer in the image layer stack associated with the layered image application. The layering system 102 can use a mapping generated between image layers in the image layer stacks when opening the layered image file.

If the layering system 102 does not find a matching layer ID between the current image layer and an image layer in the previous image layer stack associated with the layered image application, FIG. 3B illustrates that the layering system 102 performing an act 332 of generating a new image layer formatted for the layered image application. For example, the layering system 102 can generate a new image layer including image layer data from the current image layer in the image layer stack associated with the feature-restricted image application at the current location in the image layer stack associated with the layered image application. The new image layer can be formatted for the layered image file including any metadata or other layer image data that allows the layered image application to accurately read and display the new image layer. In one or more embodiments, if the image layer formatted for the feature-restricted image application includes image layer data incompatible with the layered image application, the layering system 102 can perform similar operations described above in FIG. 3A for generating the new image layer as an edit-restricted layer for displaying the new image layer within the layered image application.

As illustrated in FIG. 3B, in response to finding a matching layer ID between the current image layer and an image layer in the previous image layer stack, the layering system 102 can optionally perform an act 334 of moving a corresponding image layer to the current position in the image layer stack associated with the layered image application. Specifically, the layering system 102 can first determine whether the matching layer IDs are at the same relative position in the image layer stacks associated with the feature-restricted image application and the layered image application. If not, the layering system 102 moves the corresponding image layer formatted for the layered image application to the current position in the corresponding image layer stack. If the matching layer IDs are at the same relative position, the layering system 102 skips the act of moving an image layer.

Additionally, the layering system 102 can determine whether the feature-restricted image application made any modifications to the current image layer. As shown in FIG. 3B, in response to determining that the feature-restricted image application made changes to the current image layer, the layering system 102 performs an act 336 of applying edits made to the current image layer to a corresponding image layer. To illustrate, in response to detecting edits made to an editable layer, the layering system 102 can perform the same edits to the corresponding image layer in the image layer stack formatted for the layered image application (e.g., by replacing image layer data for the corresponding image layer with new image layer data or adding image layer data to the corresponding image layer).

Additionally, in response to detecting edits made to an edit-restricted layer (e.g., to the layer name, opacity, layer lock, or blend mode), the layering system 102 can apply the same edits to the corresponding incompatible image layer in the image layer stack associated with the layered image application. For instance, in one or more embodiments, the layering system 102 can save any changes made to the edit-restricted layer back to the incompatible image layer (e.g., if the edit-restricted layer corresponds to a single incompatible image layer). In response to an edit-restricted layer corresponding to a plurality of incompatible image layers, in one or more embodiments, the layering system 102 still allows one or more edit operations to the edit-restricted layer. The layering system 102 can thus apply the edit(s) to the plurality of layers represented by the edit-restricted layer.

After analyzing the current layer and generating a new image layer or performing edits to one or more corresponding image layers, the layering system 102 performs an act 338 of moving the image layer stack iterators for the image layer stack associated with the feature-restricted image application to the next image layer. In particular, the layering system 102 can move the iterator to the next image layer in the image layer stack (e.g., up one layer). The layering system 102 can also move the image layer stack iterator for the image layer stack associated with the layered image application. The layering system 102 can thus keep track of the position in each image layer stack in parallel.

After moving the image layer stack iterator to the next image layers in the image layer stacks to be analyzed, in some cases, the layering system 102 determines whether the image layer stack iterator for the next image layer in the image layer stack associated with the feature-restricted image application is valid. If there are more image layers in the image layer stack to analyze, the layering system 102 can repeat the acts previously described (e.g., acts 330-338) for each image layer in the image layer stack until the image layer stack iterator is no longer valid. Thus, the layering system 102 may ensure that the image layers in the image layer stack associated with the layered image application correspond to the image layers in the image layer stack associated with the feature-restricted image application at the respective positions.

As shown in FIG. 3B, in response to determining that the image layer stack iterator is not valid, the layering system 102 performs an act 340 of deleting previous image layers beyond the current image layer stack iterator in the image layer stack associated with the layered image application. Specifically, a computing device executing the feature-restricted image application may delete or combine image layers from the layered image file based on user input. The layering system 102 can determine whether a computing device has deleted or combined image layers via the feature-restricted image application based on the image layer stack associated with the feature-restricted image application having fewer image layers than the image layer stack associated with the layered image application. Accordingly, deleting previous image layers beyond the image layer stack iterator allows the layering system 102 to ensure accurate image layer conversion across image applications.

As further shown in FIG. 3B, after deleting previous image layers, the layering system 102 performs the act 342 of storing the layered image file with the updated image layer data with the correct formatting for the layered image application. When the layering system 102 stores the updated image layer data to the layered image file, the layering system 102 can open the layered image file with the layered image application in response to an open request from a user. Thus, the layering system 102 can store image layer data across a plurality of image applications having different feature sets using a single layered image file.

Figure 4A:
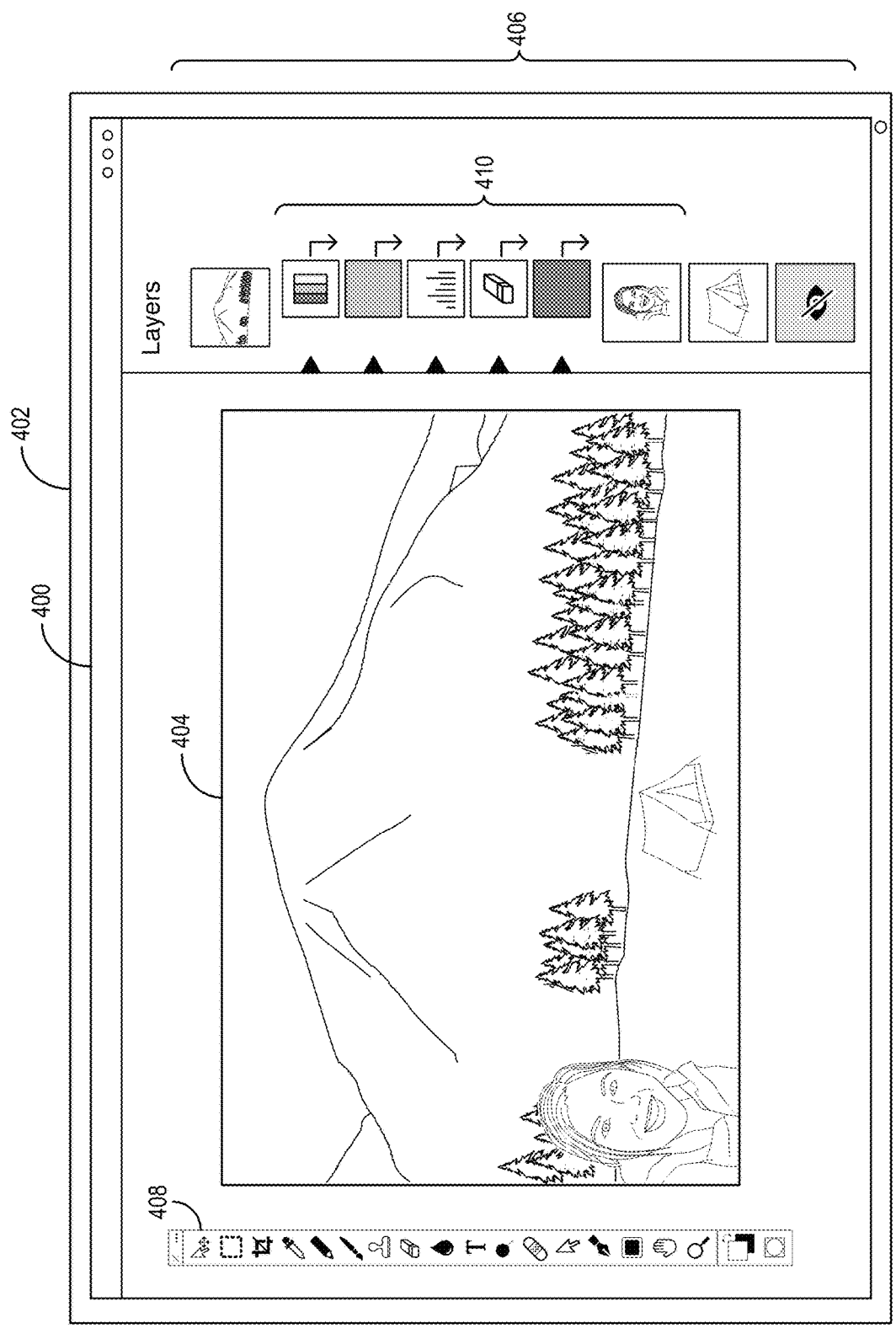
FIGS. 4A-4I illustrate a computing device presenting graphical user interfaces and layer stacks for displaying and editing an image from a layered image file in various image applications in accordance with one or more implementations.
Figure 4B:
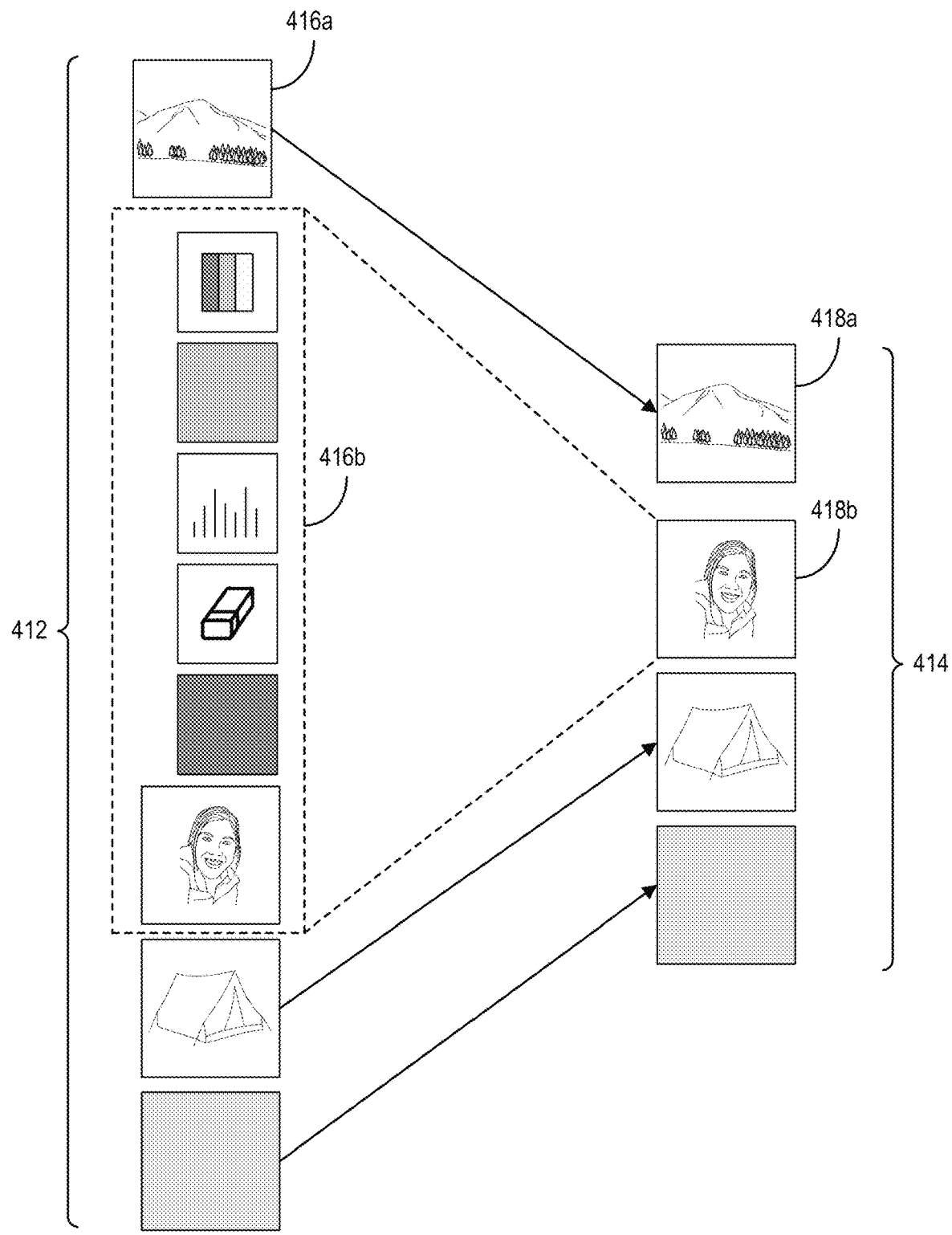
Figure 4C:
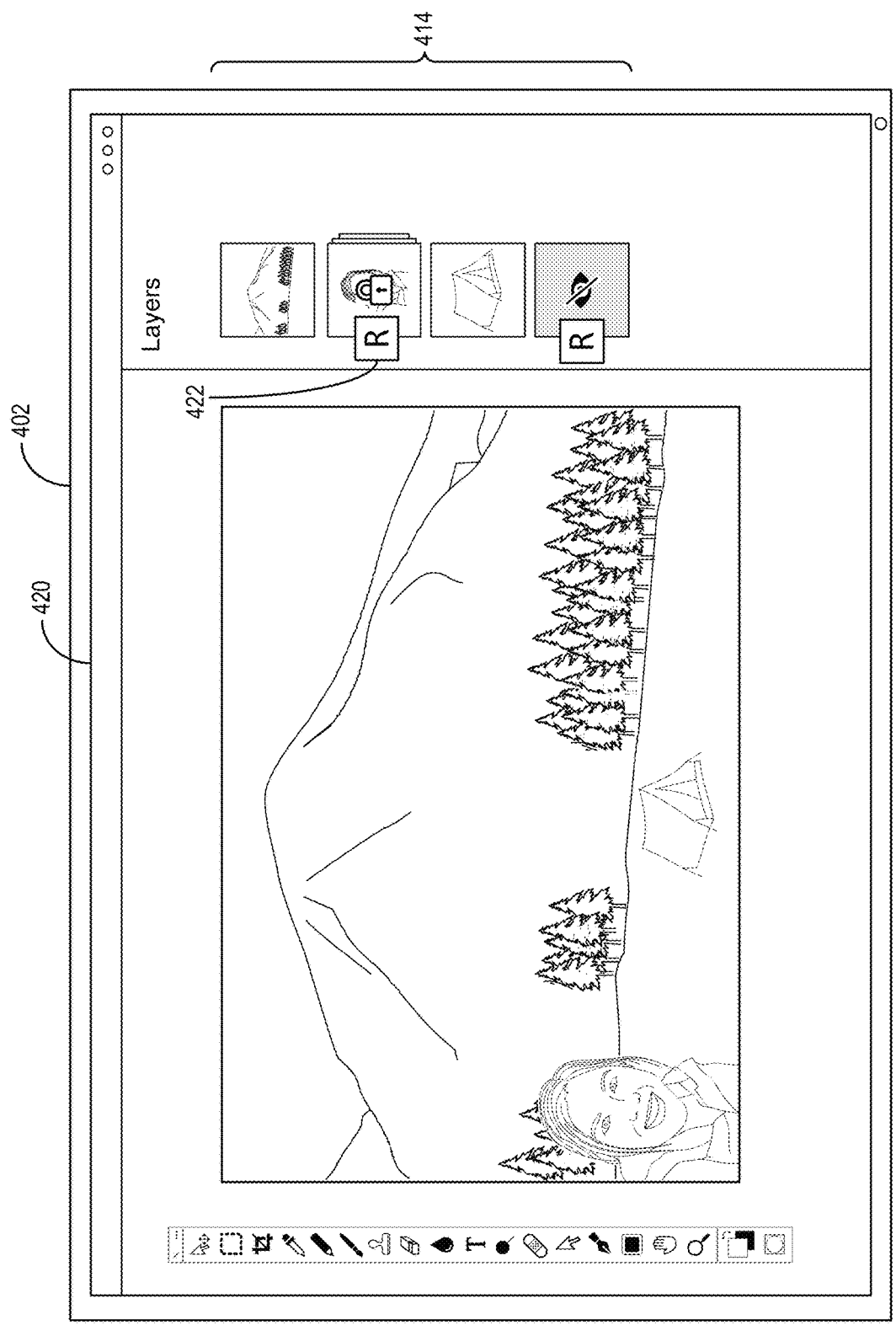
Figure 4D:
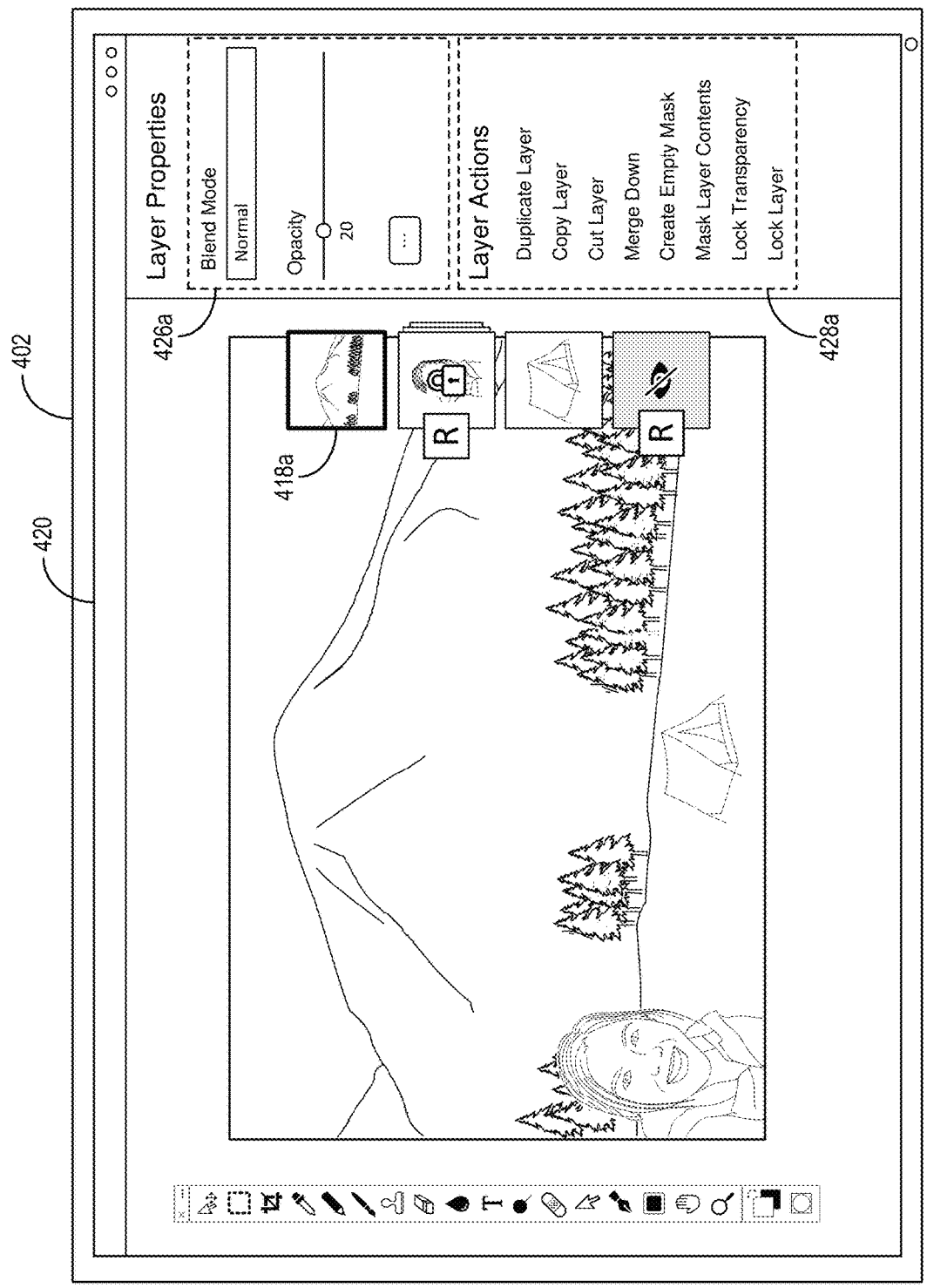
Figure 4E:
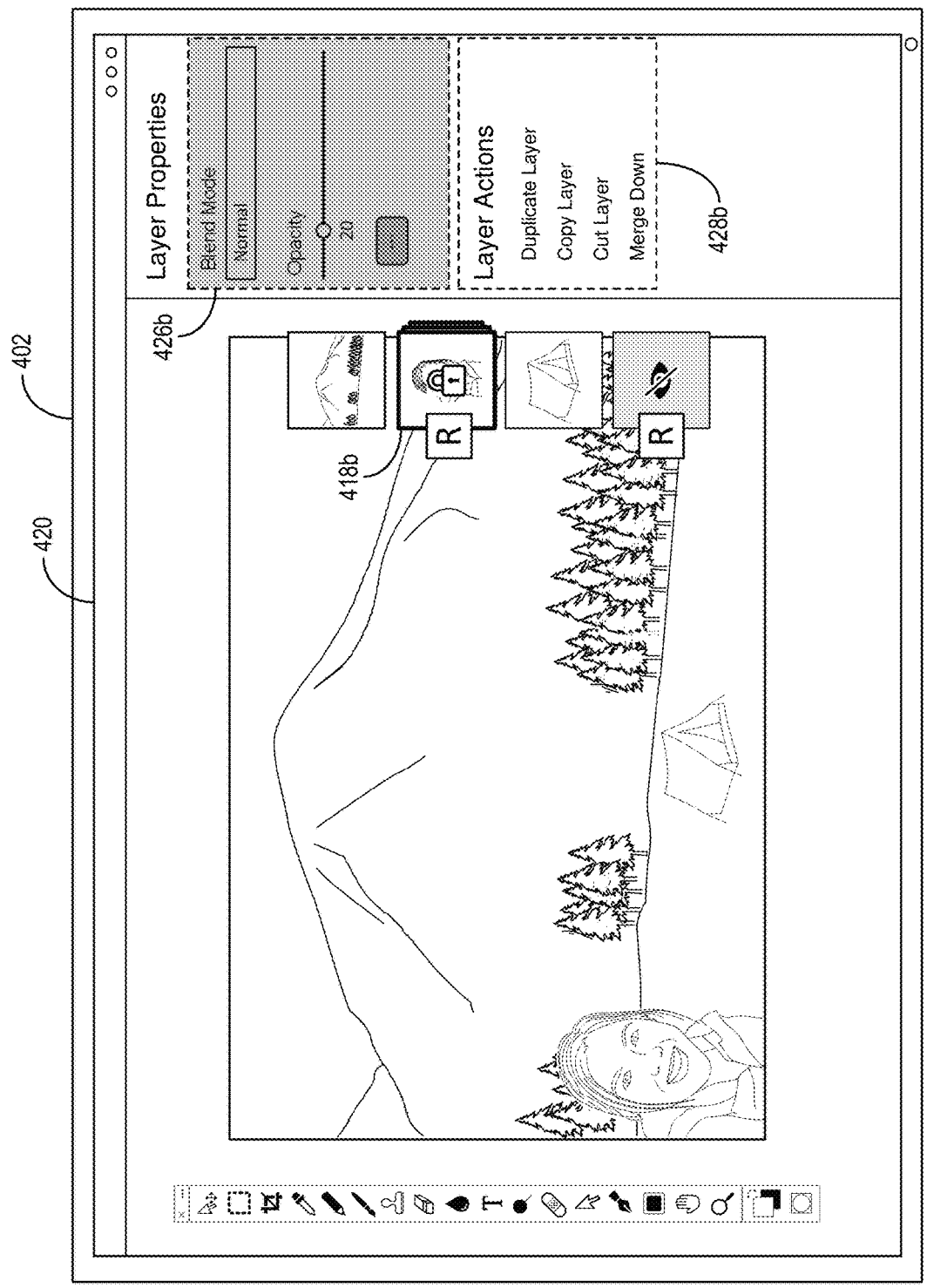

As mentioned, the layering system 102 can open a layered image file in a plurality of image applications. In accordance with one or more embodiments, FIGS. 4A-4I illustrate graphical user interfaces and layer image data associated with different image applications. As an overview, FIGS. 4A and 4I illustrate graphical user interfaces from the perspective of a client device implementing computer-executable instructions from a layered image application to perform certain actions for the layering system 102. FIGS. 4B and 4H illustrate image layer data associated with a layered image file. FIGS. 4C-4G illustrate graphical user interfaces from the perspective of a client device implementing computer-executable instructions from a feature-restricted image application to perform certain actions for the layering system 102.

As shown in FIG. 4A, in one or more embodiments, a client device 402 can execute instructions from a layered image application 400 to open, create, and edit image content 404 with image layer data. Specifically, the image content 404 may include a plurality of layers 406 including different elements of the image content 404. For instance, the layers 406 can include individual objects or visual characteristics of the image content 404 (or of specific components of the image content 404) depending on how the client device 402 generates and organizes the elements of the image content 404 based on user input. To illustrate, the layers 406 can be displayed in an order indicating whether a given layer is in front of or behind another layer based on whether the given layer is above or below the other layer in the user interface.

As further shown in FIG. 4A, the layered image application 400 includes a plurality of tools 408 for a user to create and edit image content. In particular, the tools 408 include tools for creating, modifying, or deleting layers (e.g., the layers 406) of image content. For example, the tools 408 can include tools for performing operations to add objects, cut objects, move objects, move objects, copy objects, or delete objects. Additionally, the tools 408 can include tools for performing operations to modify other visual characteristics (e.g., colors, tones, brightness, contrast) of objects or layers of the image content 404. In at least some embodiments, the layering system 102 applies filters that perform specific modifications to the layers 406 based on user input, such as blur filters, sharpen filters, warping filters, noise filters, or other filters.

According to one or more embodiments, the layering system 102 generates a new layer for each modification to one or more other layers of the image content 404. Additionally, the layering system 102 applies a plurality of modifications within a single layer. For example, FIG. 4A illustrates the layers 406 including objects displayed in different locations within the image content 404 as well as modifications to one or more other layers.

In one or more embodiments, the layering system 102 groups layers together within the layered image application 400 based on user input. For instance, FIG. 4A illustrates a subset of layers 410 grouped based on each of the layers in the subset of layers 410 applying some effect to one or more other layers in the subset of layers 410. To illustrate, one or more layers of the subset of layers 410 can include filters or adjustments that change attributes of an underlying object layer that includes an object displayed in the image content 404. Because the filters or adjustments in the subset of layers 410 apply only to the object layer, and not to any of the other layers in the image content 404, the layers corresponding to the filters or adjustments are grouped with the object layer.

As mentioned, the layering system 102 can store the image content 404 in a layered image file and then open the layered image file using a different application. In particular, the client device 402 can open the layered image file in a feature-restricted image application that has a different feature set than the layered image application 400 based on a user request to open the layered image file. When opening the layered image file in the feature-restricted image application, in some embodiments, the layering system 102 first converts the layer image data from a format associated with the layered image application 400 to a format associated with the feature-restricted image application.

FIG. 4B illustrates for the layering system 102 converting layers from a first format in a first image layer stack 412 to a second format in a second image layer stack 414. Consistent with FIG. 3A above, the layering system 102 can iterate through the first image layer stack 412 associated with the layered image application 400 to determine whether each of the layers in the first image layer stack 412 is compatible with the feature-restricted image application. For instance, the layering system 102 can analyze the layers to determine whether the layers include any attributes that the feature-restricted image application cannot process (e.g., display or features that the feature-restricted image application lacks).

Additionally, in connection with determining whether each layer of the first image layer stack 412 is compatible with the feature-restricted image application, the layering system 102 can then convert the image layer data into a format that allows accurate display of the image content 404 within the feature-restricted image application. To illustrate, the layering system 102 can convert compatible layers such as layer 416a into an editable layer 418a containing the image layer data from the layer 416a. Additionally, the layering system 102 can convert incompatible layers such as layers 416b into an edit-restricted layer 418b. The layering system 102 can thus convert all of the layers from the first image layer stack 412 into one or more editable layers and/or one or more edit-restricted layers based on the image layer data of each respective layer.

After converting the image layer data in a layered image file into a format compatible with a feature-restricted image application, the layering system 102 can then display the image content 404 from the layered image file in a user interface associated with the feature-restricted image application. For example, FIG. 4C illustrates the client device 402 presenting a graphical user interface of a feature-restricted image application 420. Although FIG. 4C illustrates the feature-restricted image application 420 operating on the client device 402 that operates the layered image application 400, the layering system 102 can open layered image files using image applications across a plurality of client devices.

As illustrated in FIG. 4C, the layering system 102 displays the image content 404 from the layered image file in the graphical user interface of the feature-restricted image application 420 such that the image content 404 appears the same as in the layered image application 400. The layering system 102 accomplishes this by the conversion process described with respect to FIGS. 3A and 4B. As further shown in FIG. 4C, the layering system 102 displays image layer data associated with the image content 404 within the graphical user interface of the feature-restricted image application 420. In particular, the layering system 102 can display the layers from the second image layer stack 414 of FIG. 4B in a portion of the feature-restricted image application 420.

In one or more embodiments, the layering system 102 modifies the image content 404 in a variety of ways based on detecting user interactions associated with the image content 404. For instance, because the layer image data can include editable layers and edit-restricted layers, the layering system 102 can display information indicating whether each layer is editable or edit-restricted. To illustrate, if a layer is edit-restricted, the layering system 102 can display an icon 422 on the corresponding edit-restricted layer indicating that the edit-restricted layer has a limited set of available operations. In one or more embodiments, the icon 422 indicates an image application that the layering system 102 used to generate the underlying layers. Additionally, if a layer is editable, the layering system 102 can display the corresponding image content or an indicator of the layer type as a layer icon for the editable layer.

Furthermore, the layering system 102 can provide visual indicators to inform a user that a layer corresponds to a single layer or to a plurality of layers. For example, if an edit-restricted layer represents more than one incompatible layer, in some cases, the layering system 102 provides a multi-layer indicator in connection with the edit-restricted layer (e.g., a layer icon indicating stacked layers). Alternatively, if a layer (editable or edit-restricted) represents a single layer, in some cases, the layering system 102 provides a single-layer indicator in connection with the layer (e.g., a layer icon indicating a single layer).

As described previously, the layering system 102 can accurately display, within a feature-restricted image application, layered image content from a layered image file that was originally formatted for a layered image application with a different feature set. The layering system 102 can also perform edit operations on certain layers—while limiting edit operations on other layers—based on detecting user interactions with layers. FIGS. 4D-4E illustrate different available edit operations for different layer types within the feature-restricted image application 420. For instance, FIG. 4D illustrates the layering system 102 unlocking layer properties 426a and a first set of available actions 428a for the editable layer 418a. FIG. 4E illustrates the layering system 102 locking layer properties 426b and a second set of available actions 428b different from the first set of available actions 428a for the edit-restricted layer 418b.

In one or more embodiments, as shown in FIG. 4D, the client device 402 presents a set of unlocked layer properties 426a for modifying various attributes of the editable layer 418a based on executable instructions from the feature-restricted image application 420. Because the editable layer 418a includes image layer data that is compatible with the feature-restricted image application 420, the layering system 102 may modify the unlocked layer properties 426a of the editable layer 418a within the feature-restricted image application 420. According to one or more embodiments, the feature-restricted image application 420 may include computer-executable instructions for a limited set of available edit operations relative to the layered image application 400. According to one or more alternative embodiments, the feature-restricted image application 420 may include computer-executable instructions for the same set of edit operations available for compatible layer image data as in the layered image application 400.

Additionally, the layering system 102 can provide an additional set of available actions 428a that a user can perform on the editable layer 418a. For instance, the set of available actions 428a can include operations to interact with the layer itself (e.g., rather than the layer properties associated with the content of the layer). To illustrate, the set of available actions 428a can include operations for duplicating, copying, cutting, or merging the editable layer 418a. The set of available actions 428a for the editable layer 418a can also include operations for creating and editing layer masks, editing a layer transparency, or locking a layer from being modified.

FIG. 4E illustrates the client device 402 presenting a set of locked layer properties 426b associated with attributes of the editable layer 418a within a graphical user interface of the feature-restricted image application 420. In contrast to the editable layer 418a, the edit-restricted layer 418b includes image layer data that is not compatible with the feature-restricted image application 420. Thus, the layering system 102 may limit, or prevent, the feature-restricted image application 420 from modifying the locked layer properties 426b of the edit-restricted layer 418b. In one or more embodiments, the layering system 102 can indicate the limits on the edit operations by graying out or otherwise modifying an appearance of the locked layer properties 426b. The layering system 102 may also provide the current layer properties of the edit-restricted layer 418b in the feature-restricted image application 420 for informational purposes.

As suggested above, the layering system 102 can provide a set of available actions 428b for the edit-restricted layer 418b that is different than the set of available actions 428a for the editable layer 418a. For example, the set of available actions 428b for the edit-restricted layer 418b can include operations to interact with the layer itself. To illustrate, the set of available actions 428b can include operations for duplicating, copying, cutting, or merging the edit-restricted layer 418b. The set of available actions 428b may exclude operations for performing other operations, such as creating and editing layer masks, etc., that are available for editable layers.

Figure 4F:
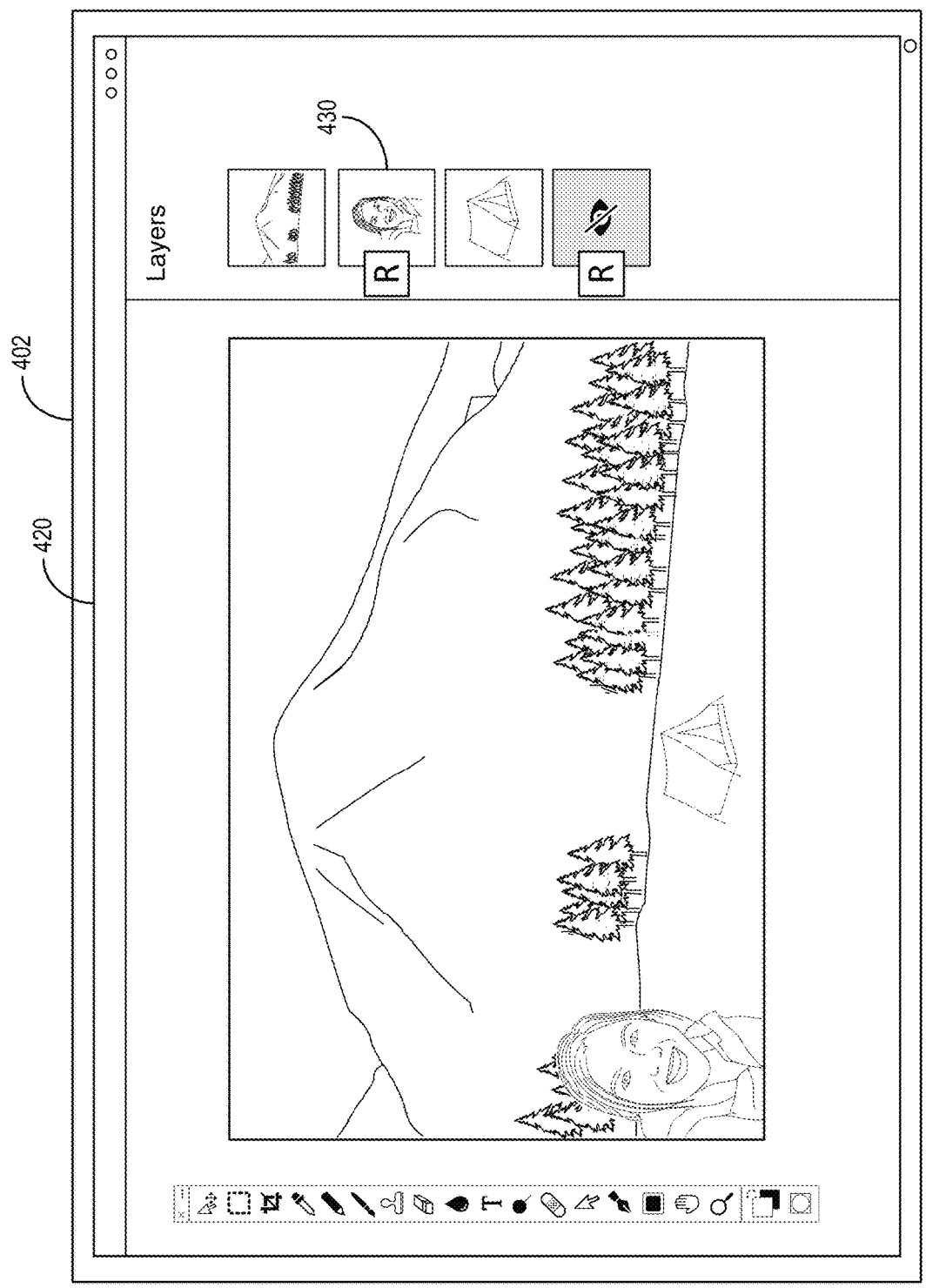

As indicated by, FIG. 4F, the layering system 102 can remove edit restrictions on an edit-restricted layer within the feature-restricted image application 420. By removing such edit restrictions, the layering system 102 allows for more edit operations on the layer properties of the edit-restricted layer. As illustrated by FIG. 4F, for instance, the layering system 102 flattens the edit-restricted layer to create a flattened layer 430 that is compatible with the feature-restricted image application 420 based on detecting a user request to flatten the edit-restricted layer. Flattening the edit-restricted layer may remove the layer properties from the edit-restricted layer (and remove the edit-restricted layer itself, in some implementations) such that the flattened layer 430 no longer has the editable modifications associated with the individual underlying layers (e.g., a user can no longer revert/delete individual layers using the layered image application 400).

In one or more embodiments, the layering system 102 generates the flattened layer 430 within the feature-restricted image application 420 by accessing features of the layered image application 400. The layering system 102 may access the features of the layered image application 400 if the feature-restricted image application 420 is unable to properly display a corresponding edit-restricted layer based on a lack of necessary features in the feature-restricted image application 420. Alternatively, the feature-restricted image application 420 may include computer-executable instructions that (upon execution) cause the client device 402 to accurately display and flatten the edit-restricted layer. Accordingly, the layering system 102 may access features of the feature-restricted image application 420 to generate the flattened layer 430.

Figure 4G:
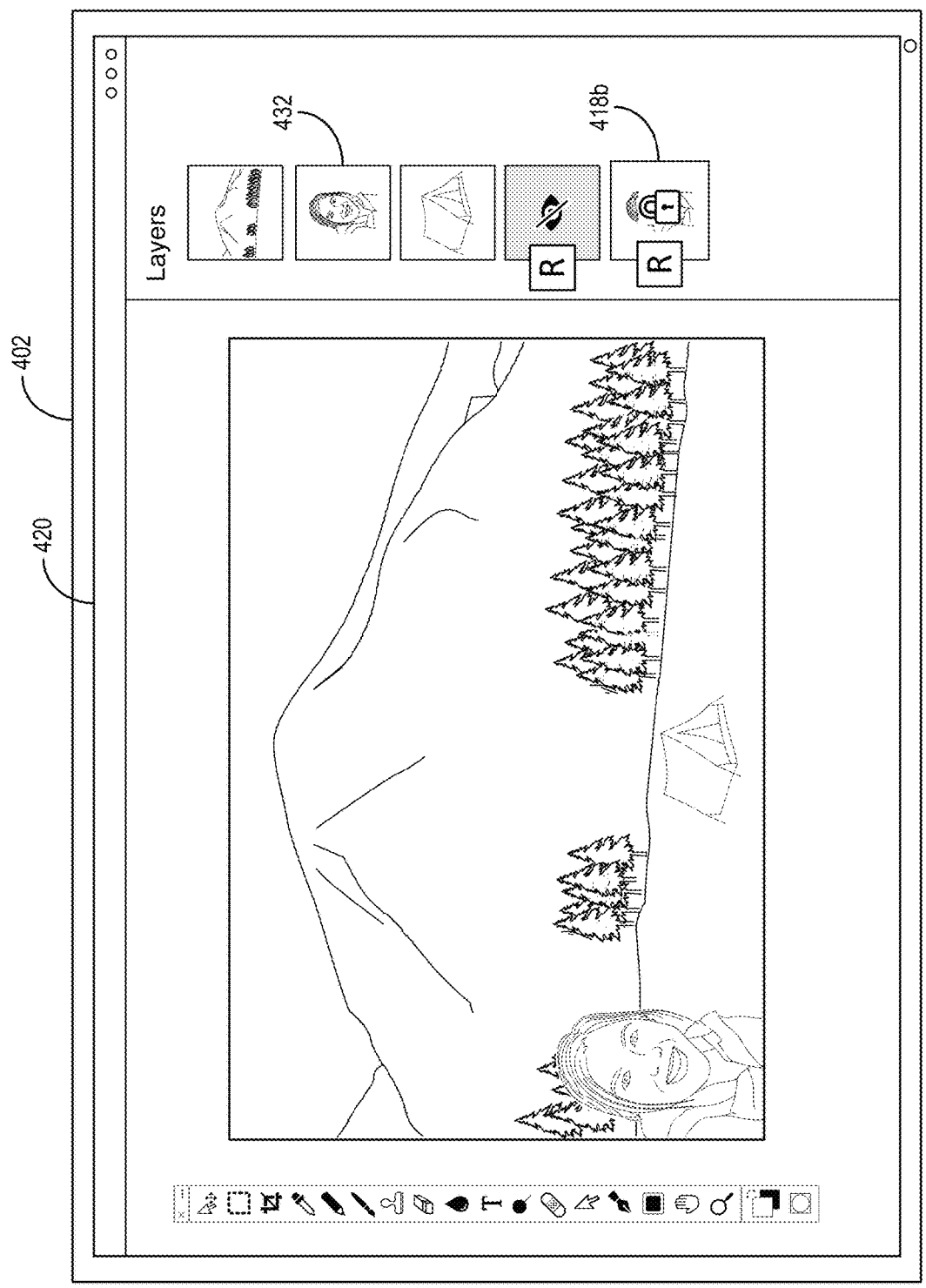
Figure 4H:
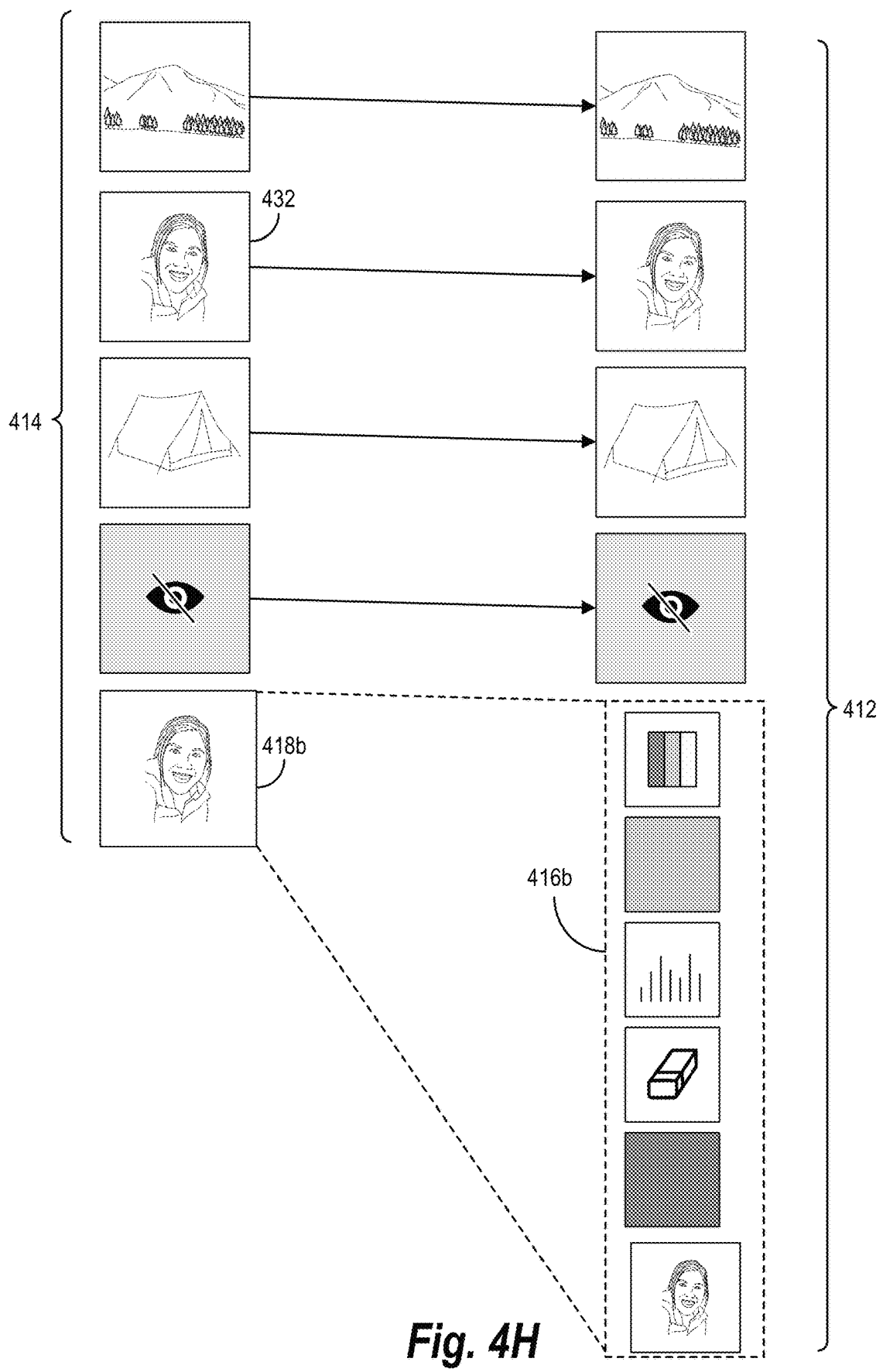
Figure 4I:
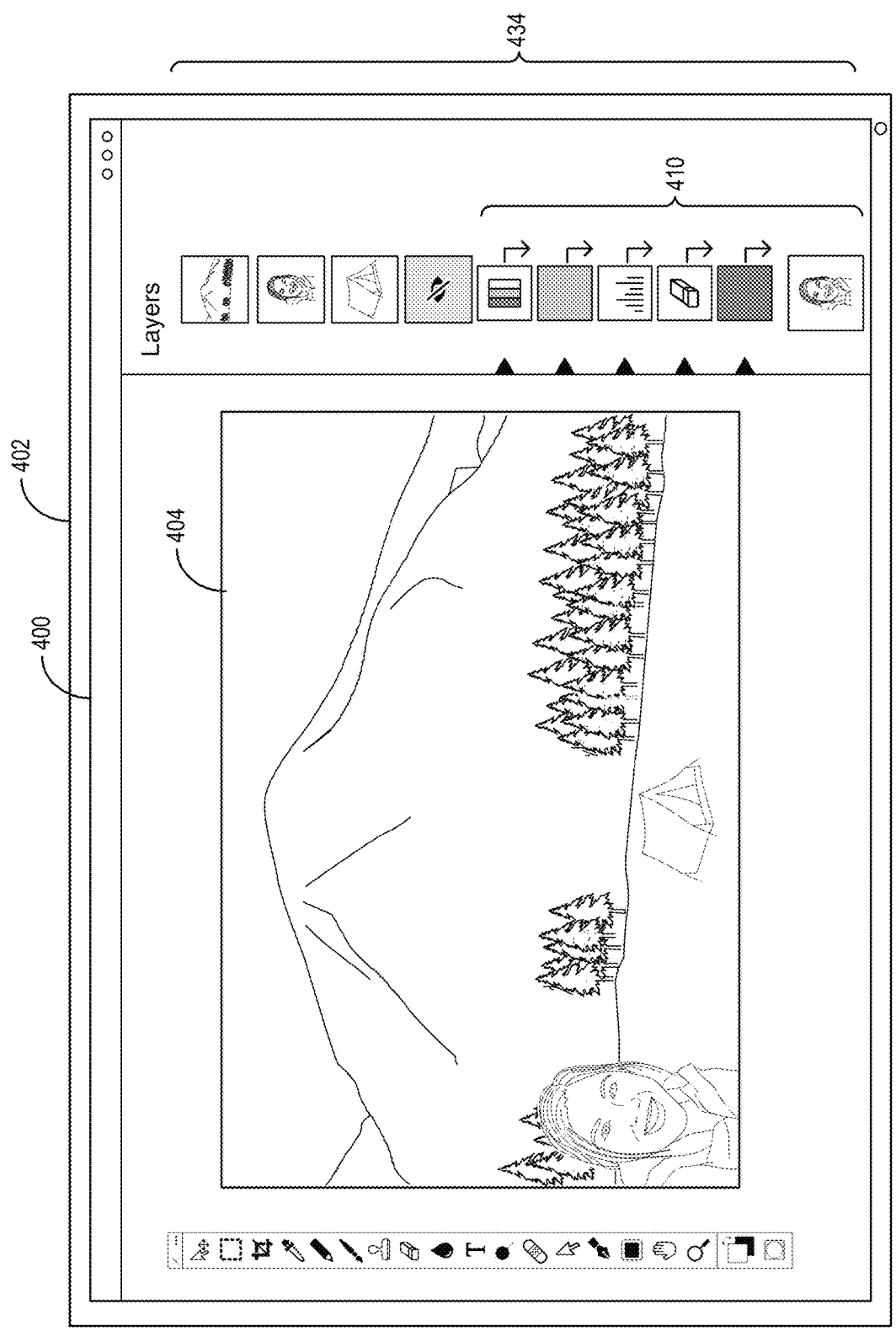

In one or more embodiments, the layering system 102 may automatically generate a flattened layer version of an edit-restricted layer if, when opening a layered image file, the layering system 102 determines that the feature-restricted image application 420 is not able to correctly display image layer data for one or more layers. As shown in FIG. 4G, the layering system 102 automatically (e.g., without a user request) generates a flattened layer copy 432 of the edit-restricted layer 418b when opening the layered image file, according to one or more embodiments. As mentioned previously, the layering system 102 can also move the edit-restricted layer 418b to a specific place in the image layer stack (e.g., by pinning the edit-restricted layer 418b to the bottom of the image layer stack) in response to determining that a corresponding incompatible layer (e.g., the top layer) associated with the edit-restricted layer 424 is an adjustment layer (or similar incompatible layer). The layering system 102 can then place the flattened layer copy 432 in the correct position within the image layer stack.

After editing a layered image file in a feature-restricted image application, the layering system 102 can store the modified image layer data back to a corresponding layered image file for viewing/editing in a layered image application. For example, FIG. 4H illustrates for the layering system 102 converting layers from a format in the second image layer stack 414 associated with the feature-restricted image application 420 back to a format in the first image layer stack 412 associated with the layered image application 400. When performing such a conversion, the layering system 102 ensures that the corresponding layers in each image layer stack are in consistent positions and that any edits made to the layers in the second image layer stack 414 within the feature-restricted image application 420 are saved back to the corresponding layers in the first image layer stack 412, as described previously with respect to FIG. 3B. The layering system 102 can also copy over new layers created in the feature-restricted image application 420 and delete corresponding layers removed using the feature-restricted image application 420.

As indicated above, the layering system 102 can open the updated layered image file using the layered image application 400. As FIG. 4I illustrates, the client device 402 presents the updated layer image data for the image content 404 in a set of layers 434 based on computer-executable instructions from the layered image application 400. Because the layering system 102 can retain the image layer data for layers that are incompatible with the feature-restricted image application 420 (e.g., the subset of layers 410), the layering system 102 can display the corresponding layers without any loss of image layer data in the layered image application. Additionally, the layering system 102 can display any additional layers or layer modifications made to the image content 404, including modifications to the order of the layers 434. Thus, the layering system 102 can accurately display the image content 404 across a plurality of image applications with different feature sets.

Figure 5:
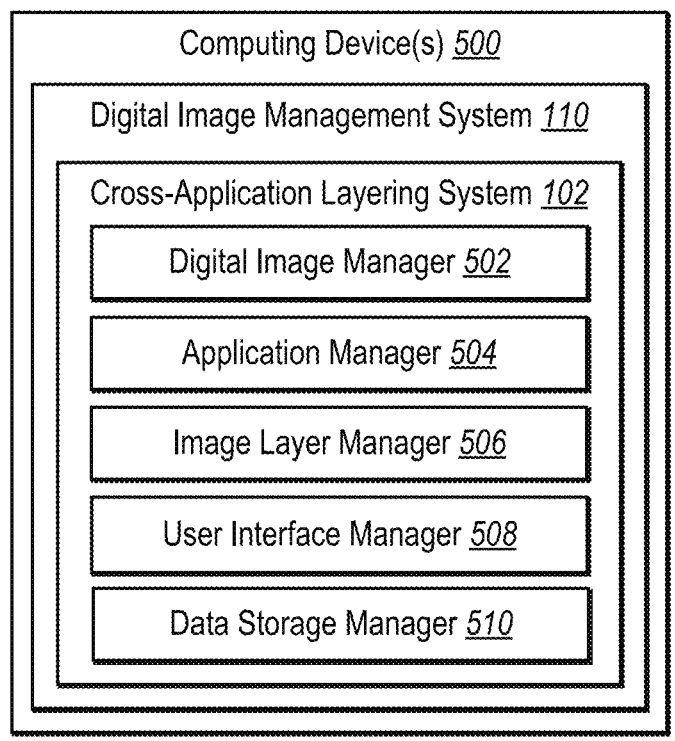
FIG. 5 illustrates a diagram of the cross-application layering system of FIG. 1 in accordance with one or more implementations.

As described in relation to the previous figures, the layering system 102 can perform operations for lossless exchange of image layer data between image applications. The operations allow the layering system 102 to accurately convert image layer data between image applications using a layered image file. FIG. 5 illustrates a detailed schematic diagram of an embodiment of the cross-application layering system 102 described above. As shown, the layering system 102 can be implemented in a digital image management system 110 on computing device(s) 500 (e.g., a client device and/or server device as described in FIG. 1 and as further described below in relation to FIG. 7). Additionally, the layering system 102 can include, but is not limited to, a digital image manager 502, an application manager 504, an image layer manager 506, a user interface manager 508, and a data storage manager 510. The layering system 102 can be implemented on any number of computing devices. For example, the layering system 102 can be implemented in a distributed system of server devices for digital image management. The layering system 102 can also be implemented within one or more additional systems. Alternatively, the layering system 102 can be implemented on a single computing device such as a single client device.

In one or more embodiments, each of the components of the layering system 102 is in communication with other components using any suitable communication technologies. Additionally, the components of the layering system 102 can be in communication with one or more other devices including other computing devices of a user, server devices (e.g., cloud storage devices), licensing servers, or other devices/systems. It will be recognized that although the components of the layering system 102 are shown to be separate in FIG. 5, any of the subcomponents may be combined into fewer components, such as into a single component, or divided into more components as may serve a particular implementation. Furthermore, although the components of FIG. 5 are described in connection with the layering system 102, at least some of the components for performing operations in conjunction with the layering system 102 described herein may be implemented on other devices within the environment.

The components of the layering system 102 can include software, hardware, or both. For example, the components of the layering system 102 can include one or more instructions stored on a computer-readable storage medium and executable by processors of one or more computing devices (e.g., the computing device(s) 500). When executed by the one or more processors, the computer-executable instructions of the layering system 102 can cause the computing device(s) 500 to perform the lossless image layer data exchange operations described herein. Alternatively, the components of the layering system 102 can include hardware, such as a special purpose processing device to perform a certain function or group of functions. Additionally, or alternatively, the components of the layering system 102 can include a combination of computer-executable instructions and hardware.

Furthermore, the components of the layering system 102 performing the functions described herein with respect to the layering system 102 may, for example, be implemented as part of a stand-alone application, as a module of an application, as a plug-in for applications, as a library function or functions that may be called by other applications, and/or as a cloud-computing model. Thus, the components of the layering system 102 may be implemented as part of a stand-alone application on a personal computing device or a mobile device. Alternatively, or additionally, the components of the layering system 102 may be implemented in a suite of applications or "apps," including, but not limited to ADOBE CREATIVE CLOUD, ADOBE PHOTOSHOP, ADOBE PHOTOSHOP ELEMENTS, ADOBE FRESCO, and ADOBE ILLUSTRATOR software. "ADOBE," "CREATIVE CLOUD," "PHOTOSHOP," "PHOTOSHOP ELEMENTS," and "ADOBE ILLUSTRATOR" are registered trademarks of Adobe Inc. in the United States and/or other countries.

As mentioned, the layering system 102 can include a digital image manager 502. The digital image manager 502 can facilitate the management of digital image files across a plurality of image applications (e.g., image editing applications that support layered image files). For example, the digital image manager 502 can store image layer data to digital image files and read image layer data from digital image files using one or more image applications. The digital image manager 502 can also provide digital image management across a plurality of applications in a distributed storage environment.

The layering system 102 can also include an application manager 504 to manage image applications in connection with layered image files. Specifically, the application manager 504 can manage user access to a plurality of image applications. The application manager 504 can also use the image applications to perform various operations associated with creating, viewing, and editing layered image content. In one or more embodiments, the application manager 504 can also access image application features from different image applications while a user is using a specific image application.

Additionally, the layering system 102 an include an image layer manager 506 to manage image layer data associated with layered image files in connection with a plurality of image applications. For instance, the image layer manager 506 can perform operations for converting image layer data from a first format (e.g., a format associated with a layered image application) to a second format (e.g., a format associated with a feature-restricted image application). The image layer manager 506 can also perform operations for converting the image layer data back from the second format to the first format.

The layering system 102 can also include a user interface manager 508 to manage graphical user interfaces for a plurality of image applications. In particular, the user interface manager 508 can cause user client devices to display image content from layered image files within a plurality of different image applications. Additionally, the user interface manager 508 can detect interactions with image content (e.g., image layer data) via one or more image applications. The user interface manager 508 can also communicate with one or more other components (e.g., the digital image manager 502, the application manager 504, or the image layer manager 506) to store and display modifications to image content.

Additionally, the layering system 102 also includes a data storage manager 510 (that comprises a non-transitory computer memory/one or more memory devices) that stores and maintains data associated with layered image files and image layer data in connection with a plurality of image applications. For example, the data storage manager 510 can store the layered image files and information associated with interactions with the layered image files. To illustrate, the data storage manager 510 can store the layered image files, as well as temporary information associated with the image layer data (e.g., the image layers and modifications to the image layers in temporary memory).

Figure 6:
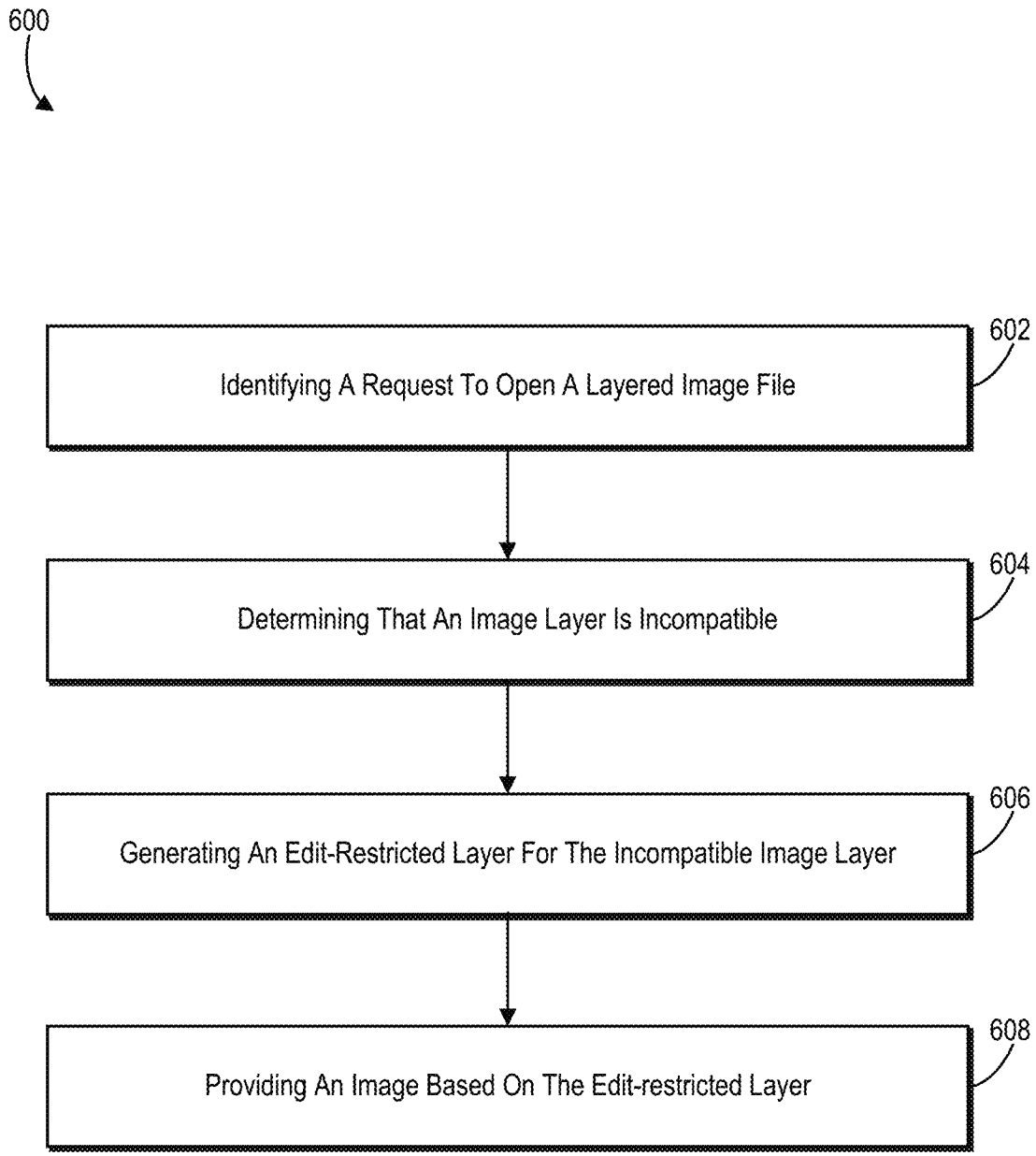
FIG. 6 illustrates a flowchart of a series of acts for generating an edit-restricted layer representing an image layer data incompatible between image editing applications in accordance with one or more implementations.

Turning now to FIG. 6, this figure shows a flowchart of a series of acts 600 of generating an edit-restricted layer representing an image layer data incompatible between image editing applications in accordance with one or more implementations. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of identifying a request to open a layered image file. For example, act 602 involves identifying a request to open in a feature-restricted image application a layered image file formatted for a layered image application. Act 602 can involve receiving a request to open the layered image file in the feature-restricted image application, wherein the layered image file comprises a file extension associated with the layered image application.

The series of acts 600 also includes an act 604 of determining that an image layer is compatible. For example, act 604 involves determining that at least one image layer of the layered image file includes a characteristic incompatible with the feature-restricted image application. Act 604 can involve, for example, determining that a feature set of edit operations or capabilities of the feature-restricted image application is not able to process image layer data of the at least one image layer. Act 604 can also involve analyzing image layers from an image layer stack within the layered image file to identify an image layer compatible with the feature-restricted image application, wherein the image layer stack comprises the image layer compatible with the feature-restricted image application and the at least one image layer including the characteristic incompatible with the feature-restricted image application.

Act 604 can also involve determining that the edit-restricted layer corresponds to one image layer. Act 604 can then involve limiting edit operations available for editing the edit-restricted layer within the feature-restricted image application. For example, act 604 can involve determining a subset of edit operations that are available for editing the edit-restricted layer and excluding one or more other edit operations from being applied to the edit-restricted layer.

Act 604 can also involve determining that the edit-restricted layer corresponds to a plurality of image layers. For example, as part of act 604, or as an additional act, the series of acts 600 can include determining that a plurality of image layers of the layered image file includes characteristics incompatible with the feature-restricted image application, wherein the plurality of image layers comprise the at least one image layer.

Additionally, the series of acts 600 includes an act 606 of generating an edit-restricted layer for the incompatible image layer. For example, act 606 involves generating an edit-restricted layer representing the at least one image layer, wherein the edit-restricted layer is compatible with the feature-restricted image application. Act 606 can involve setting attributes for the edit-restricted layer that indicate that one or more edit operations are not available for the edit-restricted layer. Act 606 can also involve assigning an identifier to the edit-restricted layer based on an identifier of the at least one image layer.

Act 606 can also involve generating an edit-restricted layer representing a plurality of image layers comprising the at least one image layer. Act 606 can then involve preventing editing of the edit-restricted layer representing the plurality of image layers within the feature-restricted image application. For example, act 606 can involve preventing one or more edit operations from being applied to the edit-restricted layer corresponding to the plurality of image layers. Act 606 can also involve assigning to the edit-restricted layer an identifier based on an identifier of a top image layer of the plurality of image layers.

As part of act 606, or as an additional act, the series of acts 600 can also include determining that an image layer of a plurality of image layers represented by the edit-restricted layer corresponds to a specific type of image layer not compatible with the feature-restricted image application. The series of acts 600 can then include placing the edit-restricted layer at a specific position in an image layer stack based on the image layer corresponding to the specific type of image layer. Additionally, the series of acts 600 can also include automatically generating, in response to the edit-restricted image layer comprising the image layer of the specific type of image layer, a flattened image layer copy of the edit-restricted layer to display within the feature-restricted image application.

As part of act 606, or as an additional act, the series of acts 600 can include determining that an additional image layer of the layered image file applies a visual effect to at least one other image layer of the layered image file, wherein the additional image layer is not compatible with the feature-restricted image application. The series of acts 600 can also involve generating, based on determining that the additional image layer is not compatible with the feature-restricted image application, a flattened image layer representing the additional image layer and the at least one other image layer, wherein the flattened image layer is editable within and compatible with the feature-restricted image application.

The series of acts 600 further includes an act 608 of providing an image based on the edit-restricted layer. For example, act 608 involves providing, for display within the feature-restricted image application on a display device, an image corresponding to the layered image file based on the edit-restricted layer. Act 608 can also involve providing the edit-restricted layer representing a plurality of image layers for display within the feature-restricted image application as a combined layer.

The series of acts 600 can also include determining that a first additional image layer of the layered image file is compatible with the feature-restricted image application and a second additional image layer of the layered image file includes a characteristic incompatible with the feature-restricted image application, wherein the first additional image layer is between the at least one image layer and the second additional image layer in an image layer stack of the layered image file. The series of acts 600 can then include generating an additional edit-restricted layer representing the second additional image layer, wherein the additional edit-restricted layer is compatible with the feature-restricted image application. Additionally, the series of acts can involve providing, for display within the feature-restricted image application on the display device, the image based on the additional edit-restricted layer.

The series of acts 600 can also include identifying a request to store to the layered image file a plurality of image layers from an image layer stack corresponding to the feature-restricted image application. The series of acts 600 can include determining a position of the edit-restricted layer in the image layer stack. Additionally, the series of acts 600 can include storing the at least one image layer corresponding to the edit-restricted layer at the position of the edit-restricted layer in a new image layer stack corresponding to the layered image application.

The series of acts 600 can also include determining that an edit operation has been performed on the edit-restricted layer within the feature-restricted image application. Furthermore, the series of acts 600 can include applying the edit operation to the at least one image layer within the new image layer stack.

Additionally, the series of acts 600 can include determining that an additional image layer of the plurality of image layers in the image layer stack does not correspond to an image layer associated with the layered image application. The series of acts 600 can then include generating, from the additional image layer, a new image layer compatible with the layered image application, and storing the new image layer to the new image layer stack.

In addition (or in the alternative) to the acts described above, some embodiments involve performing a step for converting at least one image layer of the layered image file to an edit-restricted layer. For instance, the algorithms and acts described in relation to FIG. 3A can comprise the corresponding acts and/or algorithms for a step for a step for converting at least one image layer of the layered image file to an edit-restricted layer.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
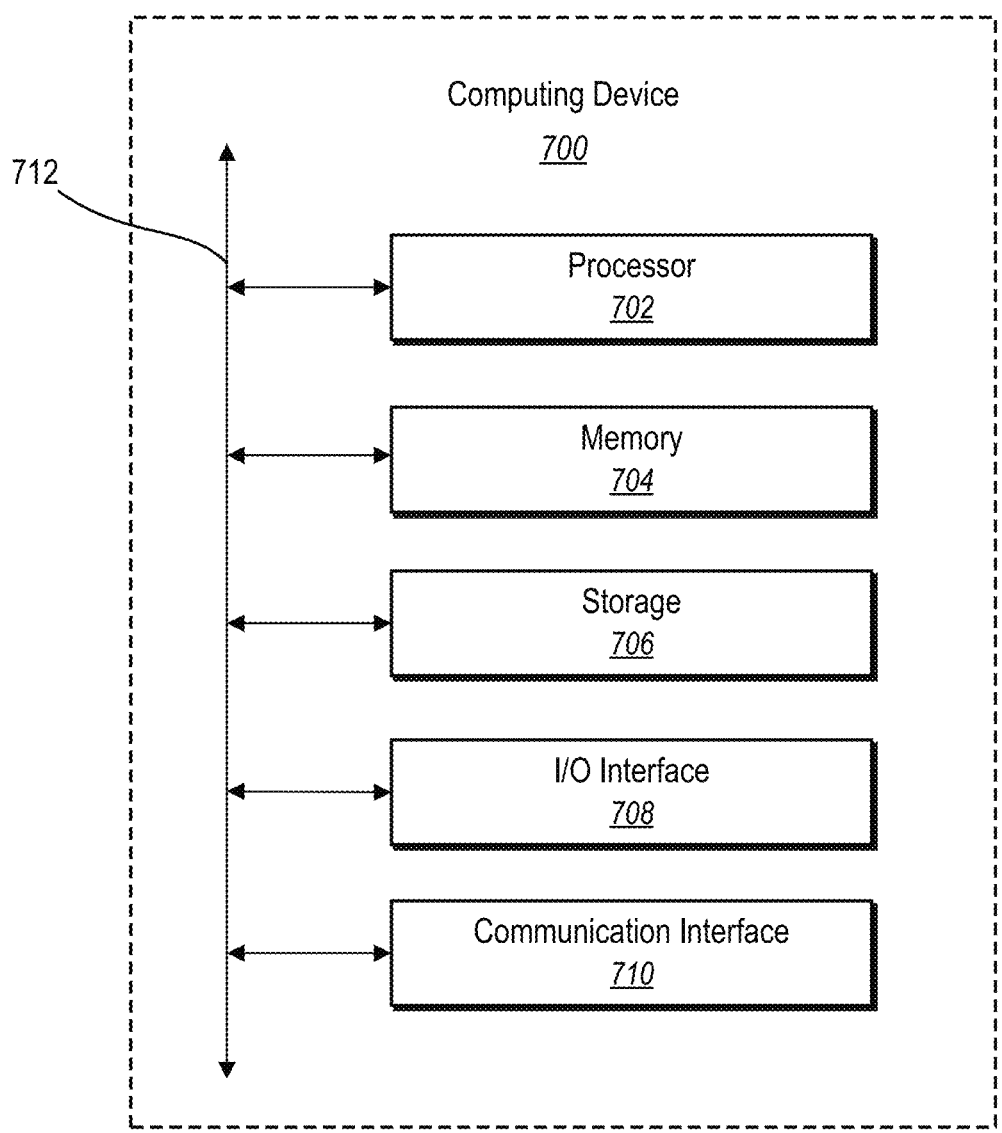
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
identify a request to open in a feature-restricted image application a layered image file formatted for a layered image application;
determine that at least one image layer of the layered image file includes a characteristic incompatible with the feature-restricted image application;

generate an edit-restricted layer representing the at least one image layer, wherein the edit-restricted layer is compatible with the feature-restricted image application; and provide, for display within the feature-restricted image application on a display device, an image corresponding to the layered image file based on the edit-restricted layer.

2. The non-transitory computer readable medium of claim 1, further comprising instructions that, when executed by the at least one processor, cause the computing device to:

determine that a plurality of image layers of the layered image file includes characteristics incompatible with the feature-restricted image application, wherein the plurality of image layers comprise the at least one image layer;

generate the edit-restricted layer representing the plurality of image layers; and provide the edit-restricted layer representing the plurality of image layers for display within the feature-restricted image application as a combined layer.

3. The non-transitory computer readable medium of claim 1, further comprising instructions that, when executed by the at least one processor, cause the computing device to:

determine that the edit-restricted layer corresponds to one image layer; and limit edit operations available for editing the edit-restricted layer within the feature-restricted image application.

4. The non-transitory computer readable medium of claim 1, further comprising instructions that, when executed by the at least one processor, cause the computing device to:

determine that the edit-restricted layer corresponds to a plurality of image layers; and prevent editing of the edit-restricted layer within the feature-restricted image application.

5. The non-transitory computer readable medium of claim 1, further comprising instructions that, when executed by the at least one processor, cause the computing device to:

determine that an additional image layer of the layered image file applies a visual effect to at least one other image layer of the layered image file, wherein the additional image layer is not compatible with the feature-restricted image application; and based on determining that the additional image layer is not compatible with the feature-restricted image application, generate a flattened image layer representing the additional image layer and the at least one other image layer, wherein the flattened image layer is editable within and compatible with the feature-restricted image application.

6. The non-transitory computer readable medium of claim 1, further comprising instructions that, when executed by the at least one processor, cause the computing device to:

determine that a first additional image layer of the layered image file is compatible with the feature-restricted image application and a second additional image layer of the layered image file includes a characteristic incompatible with the feature-restricted image application, wherein the first additional image layer is between the at least one image layer and the second additional image layer in an image layer stack of the layered image file; and generate an additional edit-restricted layer representing the second additional image layer, wherein the additional edit-restricted layer is compatible with the feature-restricted image application.

7. The non-transitory computer readable medium of claim 1, further comprising instructions that, when executed by the at least one processor, cause the computing device to:

identify a request to store to the layered image file a plurality of image layers from an image layer stack corresponding to the feature-restricted image application;

determine a position of the edit-restricted layer in the image layer stack; and store the at least one image layer corresponding to the edit-restricted layer at the position of the edit-restricted layer in a new image layer stack corresponding to the layered image application.

8. The non-transitory computer readable medium of claim 7, further comprising instructions that, when executed by the at least one processor, cause the computing device to:

determine that an edit operation has been performed on the edit-restricted layer within the feature-restricted image application; and apply the edit operation to the at least one image layer within the new image layer stack.

9. The non-transitory computer readable medium of claim 7, further comprising instructions that, when executed by the at least one processor, cause the computing device to:

determine that an additional image layer of the plurality of image layers in the image layer stack does not correspond to an image layer associated with the layered image application;

generate, from the additional image layer, a new image layer compatible with the layered image application; and store the new image layer to the new image layer stack.

10. A system comprising:

at least one memory device comprising a layered image file formatted for a layered image application; and one or more servers configured to cause the system to:

receive a request to open the layered image file in a feature-restricted image application;

analyze image layers from an image layer stack within the layered image file to identify a first image layer compatible with the feature-restricted image application and a second image layer comprising a characteristic incompatible with the feature-restricted image application;

generate an editable layer corresponding to the first image layer, wherein the editable layer is compatible with the feature-restricted image application;

generate an edit-restricted layer representing the second image layer by limiting edit operations available for the edit-restricted layer within the feature-restricted image application, wherein the edit-restricted layer is compatible with the feature-restricted image application; and provide, for display within the feature-restricted image application on a display device, an image corresponding to the layered image file based on the editable layer and the edit-restricted layer.

11. The system of claim 10, wherein the one or more servers are further configured to cause the system to:

determine that a plurality of image layers of the layered image file includes characteristics incompatible with the feature-restricted image application;

generate the edit-restricted layer representing the plurality of image layers;

provide the edit-restricted layer representing the plurality of image layers for display within the feature-restricted image application as a combined layer; and prevent editing of the edit-restricted layer within the feature-restricted image application.

12. The system of claim 11, wherein the one or more servers are further configured to cause the system to assign to the edit-restricted layer an identifier based on an identifier of a top image layer of the plurality of image layers.

13. The system of claim 10, wherein the one or more servers are further configured to cause the system to:
determine that the edit-restricted layer corresponds to one image layer; and
limit edit operations available for editing the edit-restricted layer within the feature-restricted image application.

14. The system of claim 10, wherein the one or more servers are further configured to cause the system to:
determine that an additional image layer of the layered image file applies a visual effect to at least one other image layer of the layered image file, wherein the additional image layer is not compatible with the feature-restricted image application; and
based on determining that the additional image layer is not compatible with the feature-restricted image application, generate a flattened image layer representing the additional image layer and the at least one other image layer, wherein the flattened image layer is editable within and compatible with the feature-restricted image application.

15. The system of claim 10, wherein the one or more servers are further configured to cause the system to:
determine that the first image layer is between the second image layer and an additional image layer in the image layer stack of the layered image file, wherein the additional image layer is not compatible with the feature-restricted image application; and
generate an additional edit-restricted layer representing the additional image layer, wherein the additional edit-restricted layer is compatible with the feature-restricted image application.

16. The system of claim 10, wherein the one or more servers are further configured to cause the system to:
identify a request to store to the layered image file a plurality of image layers from an image layer stack corresponding to the feature-restricted image application;
determine a position of the edit-restricted layer in the image layer stack; and
store the second image layer corresponding to the edit-restricted layer at the position of the edit-restricted layer in a new image layer stack, wherein the new image layer stack is formatted for the layered image application.

17. The system of claim 16, wherein the one or more servers are further configured to cause the system to:
determine that an edit operation has been performed on the edit-restricted layer within the feature-restricted image application; and
apply the edit operation to the second image layer within the new image layer stack.

18. The system of claim 16, wherein the one or more servers are further configured to cause the system to:
determine that an additional image layer of the plurality of image layers in the image layer stack does not correspond to an image layer associated with the layered image application;
generate, from the additional image layer, a new image layer compatible with the layered image application; and
store the new image layer to the new image layer stack.

19. A computer-implemented method, comprising:
identifying, by one or more servers, a request to open in a feature-restricted image application a layered image file formatted for a layered image application;
a step for converting at least one image layer of the layered image file to an edit-restricted layer; and
providing, by the one or more servers and for display within the feature-restricted image application on a display device, an image corresponding to the layered image file based on the edit-restricted layer.

20. The computer-implemented method of claim 19, further comprising:
identifying a request to store to the layered image file a plurality of image layers from an image layer stack corresponding to the feature-restricted image application;
determining a position of the edit-restricted layer in the image layer stack; and
storing the at least one image layer corresponding to the edit-restricted layer at the position of the edit-restricted layer in a new image layer stack corresponding to the layered image application.

* * * * *